United States Patent [19]
Levens

[11] Patent Number: 5,560,700
[45] Date of Patent: Oct. 1, 1996

[54] LIGHT COUPLER

[75] Inventor: Kurt A. Levens, Los Angeles, Calif.

[73] Assignee: Massachusetts Institute of Technology, Cambridge, Mass.

[21] Appl. No.: 286,276

[22] Filed: Aug. 5, 1994

Related U.S. Application Data

[63] Continuation-in-part of Ser. No. 152,930, Nov. 16, 1993, Pat. No. 5,371,660, which is a continuation of Ser. No. 828,754, Jan. 31, 1992, abandoned.

[51] Int. Cl.$^6$ ....................................................... F21V 8/00
[52] U.S. Cl. ............................... 362/32; 362/298; 385/31; 385/900
[58] Field of Search ................................ 362/31, 32, 26, 362/297, 298, 346, 347; 385/900, 31, 15, 33

[56] References Cited

U.S. PATENT DOCUMENTS

| | | | |
|---|---|---|---|
| 2,755,374 | 7/1956 | Ott et al. | 362/297 |
| 3,932,023 | 1/1976 | Humer | 385/37 |
| 4,074,126 | 2/1978 | Dey | 362/297 |
| 4,152,752 | 5/1979 | Niemi | 362/209 |
| 4,260,220 | 4/1981 | Whitehead | 385/133 |
| 4,459,643 | 7/1984 | Mori | 362/32 |
| 4,539,625 | 9/1985 | Bornstein et al. | 362/32 |
| 4,720,170 | 1/1988 | Learn, Jr. | 359/597 |
| 4,816,975 | 3/1989 | Bahnemann et al. | 362/32 |
| 4,956,759 | 9/1990 | Goldenberg et al. | 362/297 |
| 4,958,263 | 9/1990 | Davenport et al. | 362/32 |
| 5,002,350 | 3/1991 | Dragone | 385/31 |
| 5,016,152 | 5/1991 | Awai et al. | 362/293 |
| 5,111,367 | 5/1992 | Churchill | 362/293 |
| 5,184,883 | 2/1993 | Finch et al. | 362/32 |
| 5,271,077 | 12/1993 | Brockman et al. | 362/32 |
| 5,343,367 | 8/1994 | Davenport et al. | 362/32 |
| 5,371,660 | 12/1994 | Levens | 362/32 |

OTHER PUBLICATIONS

"TVA Office Complex–A Teamwork Approach to Energy Efficiency," *Lighting Design & Application*, Nov., 1980, pp. 31–38.

Littlefair, Paul J., "The Luminous Efficacy of Daylight: A Review," Lighting Research & Technology, vol. 17, No. 4, 1985, pp. 162–173.

Littlefair, Paul J., "Innovative Daylighting: Review of Systems and Evolution Methods," Lighting Research and Technology, 1990, pp. 1–17.

Manzini, Ezio, *The Material of Invention*, "Creating the Transparent," 1989, p. 214.

Ngai, Peter Y., "Solar Illumination for Interior Spaces," *Lighting Design & Application*, Apr., 1983, pp. 26–33.

Rodgers, Nancy C., "The Potential of Beam Sunlighting," *Lighting Design & Application*, Apr. 1983, pp. 33–35.

(List continued on next page.)

Primary Examiner—Leonard E. Heyman
Attorney, Agent, or Firm—Testa, Hurwitz & Thibeault

[57] ABSTRACT

A light coupler includes an array of non-imaging optical microcollectors. Each of the microcollectors has an entrance aperture for receiving light emitted from a source, an optical axis, and an exit aperture for emitting the light received by the entrance aperture. The array of non-imaging optical microcollectors are adapted and arranged such that the entrance apertures together subtend an acceptance angle for accepting divergent light emitted from the source and such that the optical axes of the non-imaging optical microcontrollers converge. The acceptance angle preferably is substantially matched to a divergence angle of the source. The entrance apertures can be mapped to a portion of a spherical surface (e.g., a hemisphere) which has a radial center at an apparent or actual center of the source. Alternatively, the entrance apertures can be mapped to a portion of a parabolic surface which has a focus at an apparent or actual center of the source. In general, the entrance apertures can be mapped onto any hollow volume.

28 Claims, 21 Drawing Sheets

OTHER PUBLICATIONS

Shanus, Michael D. et al., "Going Beyond the Perimeter With Daylight," Lighting Design & Application, Mar., 1984, pp. 30–40.

Smart, M., "Tracking Mirror Beam Sunlighting For Deep Interior Spaces," Solar Energy, vol. 30, No. 6, pp. 527–536, 1983.

Ruck, Nancy, et al., "The Passive Daylighting of Building Interiors," *Proceedings of the Second International Daylighting Conference,* vol. 31, pp. 87–98.

Whitehead, L. A., et al., "Large-Scale Core Daylighting by Means of a Light Pipe," pp. 416–419.

Whitehead, L. A., "New Efficient Light Guide for Interior Illumination," Applied Optics, vol. 21, No. 15, pp. 2755–2757.

Whitehead, Lorne A., "A New Device for Distributing Concentrated Sunlight in Building Interiors," Energy and Buildings, 1984, pp. 119–125.

Winston, Roland, "Nonimaging Optics," *Scientific American,* Mar., 1991, pp. 2–7.

Zastrow, Armin et al., "Daylighting with Mirror Light Pipes and with Fluorescent Planar Concentrators," SPIE, vol. 692, 1986, pp. 227–234.

The NiOptics Corporation, "The Proprietary Technology".

Van, *Chicago Tribune,* "Casting Technology in a Whole New Light", Mar. 4, 1991, pp. 1–2.

Arch, "Bridging Science and Industry," Jan., 1991, pp. 1–15.

TIR Systems Ltd., "Introducing a Whole New Way to Light up the Night. The Lightpipe Building Highlighting System," 1988.

OCLI Commercial Products Division, catalog, pp. 40–42, copyright 1989.

Smith et al., "The Passive Transmission of Natural Light to Deep Building Interiors", pp. 420–423.

Eljadi, "Solar Optics: Development and Implementation", pp. 261–265.

Aizenberg, J. B., et al. "A New Principle of Lighting Premises by Means of the Illuminating Devices with the Slit Lightguides," pp. 412–425.

Bennett, David J., "Solar Optics: Light as Energy; Energy as Light," Underground Space, vol. 4, No. 6, pp. 349–354.

Bergman, R. S., "Halogen IR Lamp Development: A System Approach," Journal of the Illuminating Engineering Society, Summer 1991.

Duguay, M. A., et al. "Lighting with Sunlight Using Sun Tracking Concentrators," Applied Optics, vol. 16, No. 5, May, 1977, pp. 1444–1446.

Engle, Claude et al. "Hong Kong Bank Scoops the Sun," *Lighting Design,* Nov., 1986, pp. 5–11.

Fraas, L. M., et al., "Concentrated and Piped Sunlight for Indoor Illumination," Applied Optics, vol. 22, No. 4, 15 Feb. 1983, pp. 578–582.

Johnson, K. et al., "Light Guide Design Principles," Nov., 1986, pp. 1–21.

Lawrence Berkeley Laboratory, "Windows & Lighting Program," 1989 Annual report, pp. 1–18.

Lawrence Berkeley Laboratory, "Windows and Lighting Program", 1988 Annual Report, pp. 5–1 to 5–18.

Leslie, R. P., "Core Daylighting: Building Code Issues," pp. 407–410.

LIGHT COUPLER

CROSS-REFERENCE TO RELATED APPLICATIONS

This is a continuation-in-part of U.S. patent application Ser. No. 08/152,930, filed Nov. 16, 1993, now U.S. Pat. No. 5,371,660, which is a continuation of U.S. patent application Ser. No. 07/828,754, filed Jan. 31, 1992, abandoned. U.S. patent application Ser. No. 08/152,930 is incorporated herein by reference.

BACKGROUND OF THE INVENTION

The invention relates to illumination systems, and in particular to illumination systems that include optical channels for distributing light.

The proficiency with which lamps produce and deliver light into a building is described by the product of two terms, luminous efficacy and luminous efficiency. The luminous efficacy (or simply efficacy) of a source is an efficiency at which a lamp converts electrical energy into visible light, and is expressed in lumens per watt. The luminous efficiency (or simply efficiency) of a fixture is the percentage of light that escapes the fixture in relation to the amount of light that is generated inside of it by the lamp, and may be affected by fixture design and the accumulation of dust and dirt on luminare, lamp, and room surfaces.

Systems for collecting sunlight and distributing it within a building have been proposed and some such systems have been built. These systems generally include a solar collector and an optical path for directing received light to areas within the building. They may also include a cold mirror or the like for diverting the infrared portion of the solar spectrum to make electricity or heat. The use of an optical path for the distribution of artificially generated light has also been proposed. Products exist that include a lamp and a light guide, permitting exclusion of the lamp from environments with explosion or fire hazardous conditions, environments sensitive to radio and magnetic interference, cooled spaces, and locations (e.g., above swimming pools) where relamping is difficult. A need for a highly efficient light piping system exists.

Selectively reflective coatings have been provided on tungsten lamps to reflect radiated energy in the near-infrared back to the filament of the lamp.

Artificial illumination, however, generally remains an inefficient process, typically converting much less than 50% of its input energy into visible light.

SUMMARY OF THE INVENTION

In one general aspect, the invention comprises an illumination system including an artificial radiant source that emits energy in the visible, infrared (IR), and ultraviolet (UV) regions of the electromagnetic spectrum. A radiation splitter splits the majority of the visible energy from the majority of the infrared energy to form an illumination beam and a heating beam. The radiation splitter can also direct the UV into either the illumination or heating beam. A light conductor conducts portions of the visible light to at least one area to be illuminated, and a heat recovery system recovers energy from the heating beam and provides it at an energy output. A solar collector may direct a solar beam on the radiation splitter to supplement the artificial source beam.

The invention may also comprise a lighting system, which includes a supporting portion that supports a lighting fixture. An artificial illumination source is placed at a position that is unsupported by the supporting portion, and a light conductor provides an optical path for radiation produced by the source to the fixture.

The illumination system of the invention is particularly well suited to conventional illumination sources, some of which have an excellent perceived quality of light, but tend to radiate a large percentage of energy outside of the visible range. A large portion of this energy may be recovered because the system may recover energy at a high thermodynamic efficiency by concentrating radiated heat onto a small, high-temperature heat recovery area. This recovery can also be performed without dissipating artificially generated light in the heat recovery system. The optical configuration of the illumination system forms the basis for comprehensively managing the radiative output from an electric source.

The illumination system of the invention is also particularly well suited to the efficient and economical use of solar energy in buildings. Indeed, an integrated solar/artificial illumination system with central heat recovery is sufficient for around-the-clock illumination, and its cost may be offset by the elimination of separately wired electric luminaries. The integrated system is superior to daylighting supplemented by localized electric luminaries, as heat generated by the artificial sources is recovered centrally, rather than being not only wasted, but a load on the building's air conditioning as well. Installation costs of the integrated system of the invention are low because it permits the recovery of solar energy in areas where a completely separate solar system might not be economical, and/or the recovery of heat from artificial sources in applications where this recovery might not be justified by itself.

The system according to the invention permits easy cleaning and replacement of bulbs and the like because they are centrally located, and these operations may be performed during the day, while light is supplied by the sun. Cleaning and replacement operations may therefore be performed at a significantly lower expense by regular daytime employees, adding to the savings afforded by the system. If desired, these cleaning operations may then be performed more frequently, thereby increasing energy efficiency, or the centralized fixture may be shielded from dust and other contaminants to further reduce the cost of keeping the sources clean. Certain structures for supporting luminaries, such as utility poles, may be made at a reduced cost, as they need not support an electric source and associated fixturing.

In general, in another aspect, the invention features a light coupler having a microcollector array of non-imaging optical concentrators having an entrance aperture for receiving light from a source. The source can include a non-imaging optical concentrator having a reflective surface, or a refractive medium, for concentrating light entering its entrance aperture, and an exit aperture for emitting the concentrated light into the entrance aperture of the microcollector array.

The microcollector array of this invention includes a plurality of non-imaging optical micro-concentrators that can have entrance apertures adapted and arranged to overlap. The entrance apertures of the optical concentrators can be arranged to contour portions of a variety of volumetric curved surfaces, including a hemispheric surface, a parabolic surface, and a helical surface. A light conductor is coupled to the exit aperture of each micro-concentrator for conducting the light from the exit aperture to a remote location. The microcollector array of this invention also includes a light conductor coupled to the entrance aperture of the microcollector array for delivering light from a remote source to the microcollector array. The light conductor includes a single optical fiber, a plurality of optical fibers, and a PLG tube.

The microcollector array of this invention further includes having an entrance aperture that subtends an acceptance angle for accepting divergent light emitted by the source. The acceptance angle subtended can be between 10° and 40°, or can be substantially matched to the divergence angle of the source. The illumination system can also include an inverted non-imaging optic concentrator for collimating light from an artificial light source, or a plurality of inverted non-imaging optic concentrators for partitioning and collimating the light from an artificial source.

DESCRIPTION OF THE INVENTION

Figure 1:
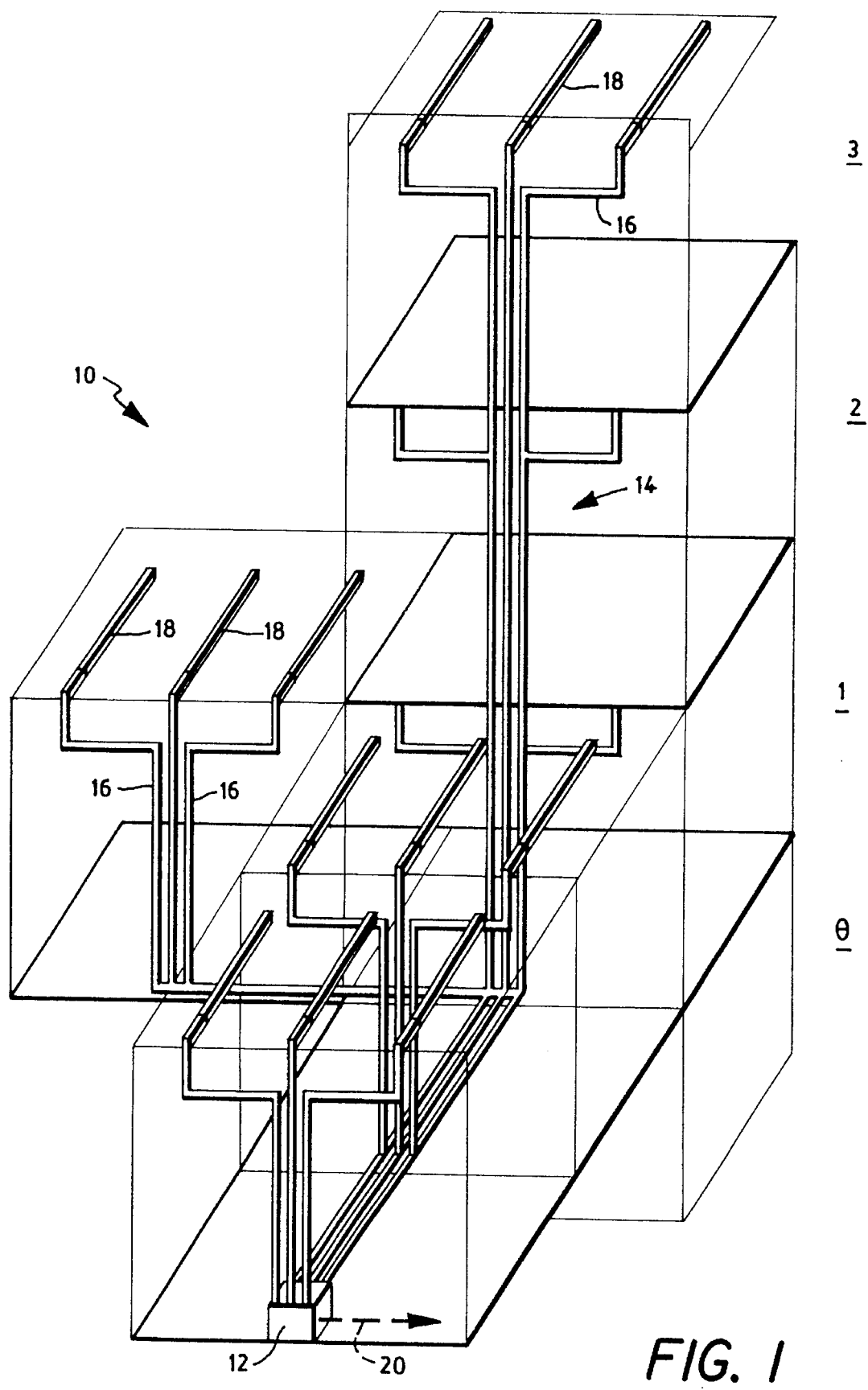
FIG. 1 is a diagrammatic perspective view of a multi-story building equipped with an illumination system according the invention.
Figure 2:
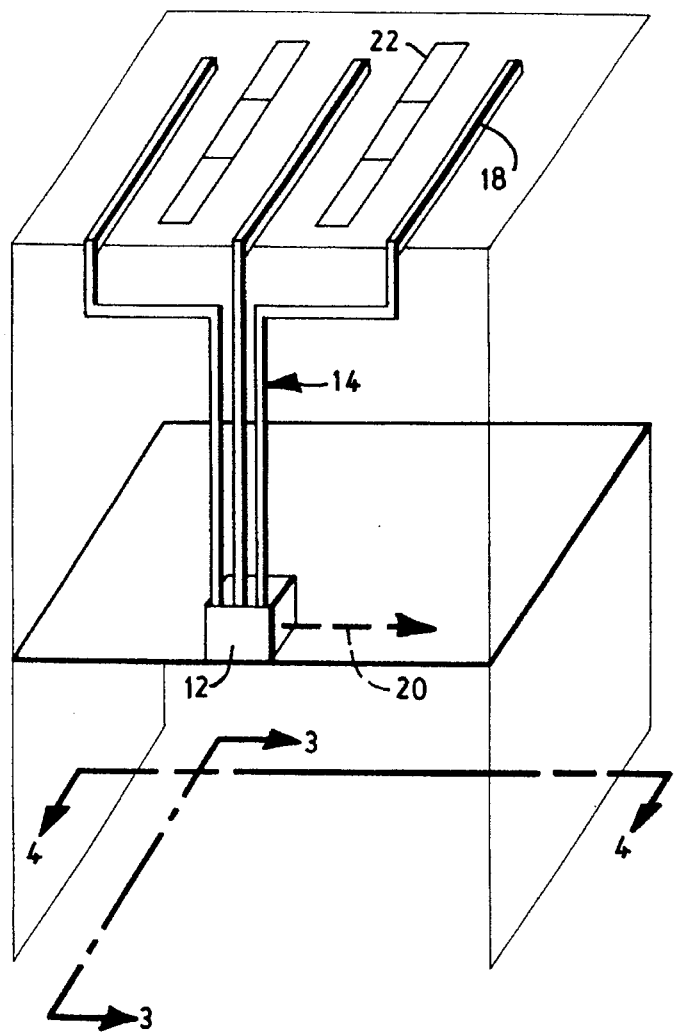
FIG. 2 is a diagrammatic perspective view of an embodiment of the invention for use with a single story building.
Figure 3:
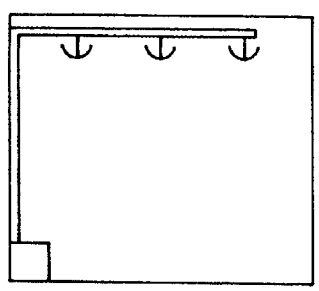
FIG. 3 is a diagrammatic section of the embodiment of FIG. 2 as indicated by 3—3.
Figure 4:
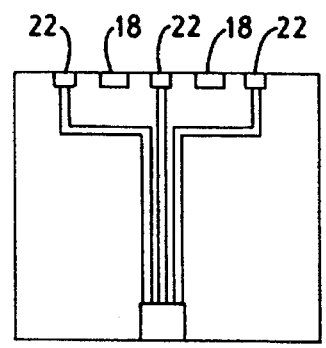
FIG. 4 is a diagrammatic sectional view of the embodiment of FIG. 2 as indicated by 4—4.

Referring to FIG. 1, a multi-story building 10 includes a central source 12 optically coupled to an illumination network 14. The illumination network 14 is made up of a series of optical distribution channels 16 coupled to the source 12 and to lighting fixtures, or luminaries 18. Briefly, light is generated in the source 12 and distributed through the network 14 to the illumination fixtures 18 which serve to illuminate rooms on the various floors of the building 10. Energy 20 is recovered from the source and may be used in the form of heat or in another form, such as electricity. Referring to FIGS. 2–4, light provided by the fixtures 18 may be supplemented by separately wired conventional electrical fixtures 22, which may be preexisting fixtures in the case of a retrofit central illumination system.

Figure 5:
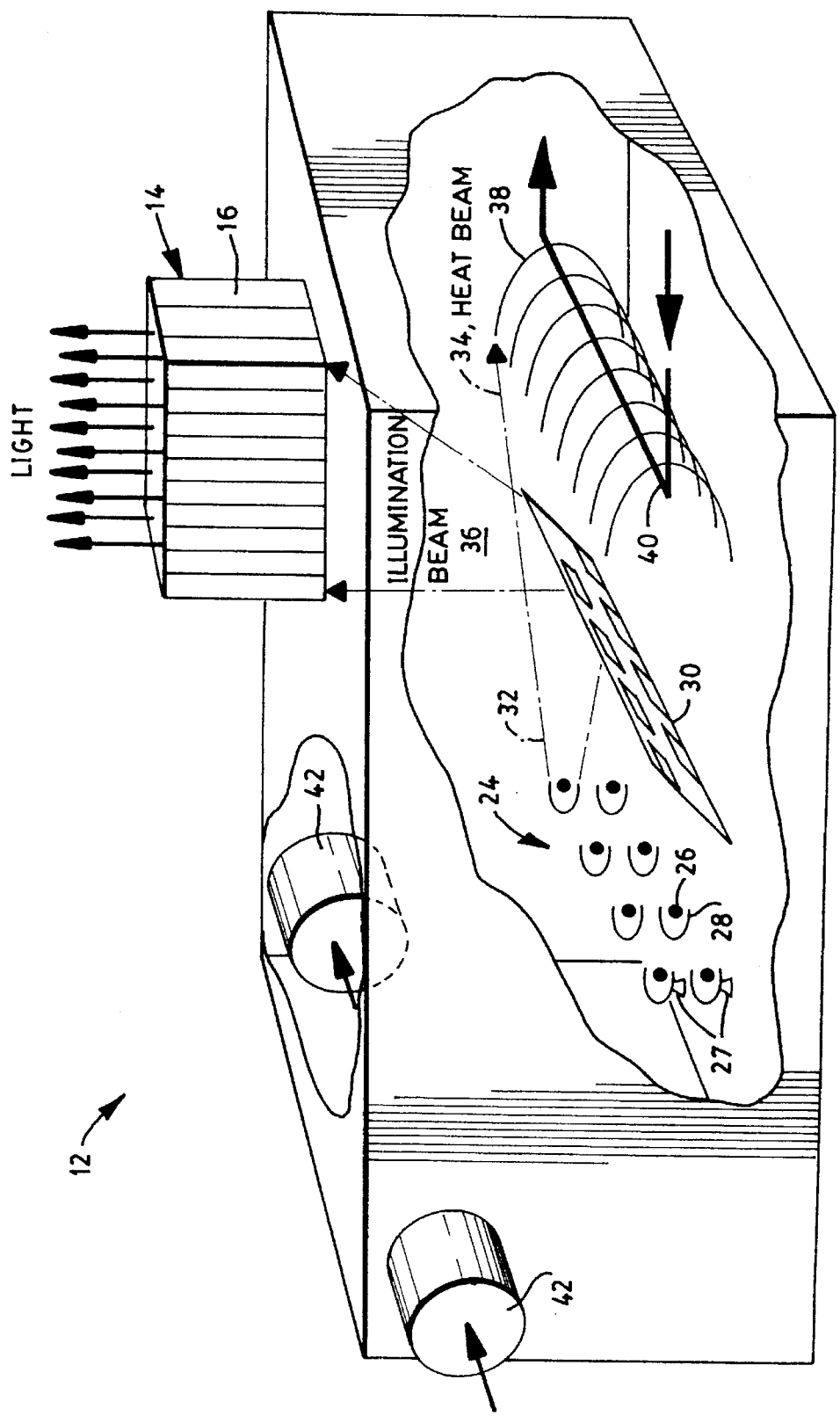
FIG. 5 is a perspective illustration of the source of FIG. 1.

Referring to FIG. 5, the central source 12 includes one or more sources 26, such as disposable Xenon Arc, HMI metal halide (Osram) lamps, or high brightness lamps that may be arranged in a matrix or bank, and associated reflectors 28. A radiation splitter 30, such as a cold mirror or a matrix of cold mirrors, is positioned to receive the radiant energy beam 32 from the sources. This radiation splitter splits (or decouples) the radiant energy beam 32 generated by the source into two beams: the heat (or recovery) beam 34 and the illumination beam 36. The radiation splitter may be a selectively reflecting mirror, such as a cold mirror, which reflects energy above a transition frequency between the visible and infrared regions of the electromagnetic spectrum to split the majority of the visible energy in the source beam from the majority of the infrared energy in the source beam. The radiation splitter may also have a second transition frequency permitting inclusion of ultraviolet energy in the heat beam. Such a splitter can act as a band-reject filter, reflecting visible light while passing infrared, and ultraviolet energy. Hot mirrors and band pass filters are usable as well, requiring a reversed configuration.

In the case where ultraviolet light is included with the visible light beam, the ultraviolet light can be transported along the fiber with the visible light to stimulate phosphor emissions at the emission end of the fiber. Each ultraviolet photon has twice the inherent energy as a visible photon, so it is expected that the total luminous efficacy of the system would be the visible luminous efficacy plus the ultraviolet efficacy of the source.

The illumination beam 36 is directed to the input of the optical distribution network 14 by supporting fixtures 27, and may be coupled into the fiber by coupling optics, such as a non-imaging optic concentrator. The heat beam 34 is directed towards a non-imaging optic collection/concentration trough 38. This trough concentrates the heat beam onto a small area 40, which constitutes an input portion of a primary heat recovery system. The primary heat recovery system may include an electric generator, such as one or more photovoltaic cells, a forced liquid heating tube, a forced air heating duct, or may simply collect radiative heat into fibers for heat distribution. The alignment of the sources and the positioning of the collection/concentration trough is configured to maximize energy throughput. The input portion of the primary heat recovery system may be provided with a surface that optimizes the coupling of energy from the heat beam, such as an antireflective or other coating.

A secondary heat recovery system 42 is installed to recover the small percentage of inevitable source conduction and convection losses, which may be due in large part to mirror's absorption of ultraviolet radiation generated by the source. This secondary system may operate using ducted forced air or liquid, and may be partially integrated into the primary heat recovery system. Alternatively, convective and conductive heat losses may be minimized, e.g., by evacuating the housing of the source or by supporting the source in a fixture designed to optimize the level of conductive losses.

By centralizing light production, radiative heat losses are centralized and may be concentrated to yield a very large component of high thermodynamic quality heat, which may be recycled into a power source. The lighted space may therefore be illuminated by lamps with lower efficacy because excess heat may be recovered. Even when compared with relatively efficient conventional lighting systems, lighting related electrical energy consumed by a building may be cut in half by contributing its high temperature heat component to activate the mechanical HVAC system of the building. Moreover, the heat generated in lighting the building contributes no heat load on the building's cooling system, resulting in further energy savings.

The optical system of the invention, in essence, breaks the radiative source of the building into two subordinate energy systems, a light system and a heat system (portion of HVAC). Since source heat is recovered and used for power it can be seen that, in the traditional sense, luminous efficacy of the illumination system is directly related to only that portion of the total wattage converted to light. The energy proficiency and cost economies of centralized and conventional illumination systems may be compared by using the quantity of lumens delivered to the space as a common denominator, and establishing the overall energy required to attain that prescribed lumen output as well as the overall costs mandated by the construction of the comparative systems.

For example, it can be readily deduced that for a source with a high percentage of radiative output, such as metal halide HMI (Osram), recovery of its radiant IR (around 50% of total energy) at 80% efficiency results in a system luminous efficacy increasing from 100 lm/w to 166.7 lm/w. Similarly, recovery of radiant heat (around 90% of total energy radiated) from an incandescent halogen source at 20 lm/w at 80% efficiency would result in luminous efficacy increasing to 71 lm/w. Through the use of a precise band reject filter, the luminous efficacy of the system could be expected to reach 250–320 lumens per watt, regardless of the type of source. The luminous efficacy, in this case, depends on the selected transmission spectrum. A single watt of power uniformly distributed between 380 nm and 770 nm yields 187 lm/w. Therefore, the highest attainable efficacy of a continuous spectrum source is 187 lm/w. However, a watt of power uniformly distributed between, for instance, 430 nm and 680 nm yields a greater luminous efficacy of 314 lm/w, with only a minor, if at all perceptible, change in neutrality of color. Inclusion of UV along with the propagated visible light could stimulate phosphor emission at the emission end of the fiber. A UV photon has twice the inherent energy of a visible photon. Therefore, the luminous efficacy of the system is expected to be a combination of the luminous efficacy of the visible light and the UV efficacy of the source. Such combination could double the maximum luminous efficacy yield to, for instance, 628 lm/w, if a source that emitted solely in the UV band were derived and used to drive the illumination system. These examples do not take into account, however, the additive energy savings of eliminated lighting related cooling load or the downsizing of building cooling and heating equipment resulting from lower loads.

The non-imaging collector/concentrator trough 38, which is derived from a class of non-imaging high aberration optics, is the basis of a method for nearly complete radiative heat collection. The high flux densities obtained in the non-imaging collection of solar energy indicate that very high temperatures can be attained in the concentration process. A discussion of these optical elements may be found in "Nonimaging Optics", Scientific American, March 1991, by Roland Winston. Nonimaging optic elements and/or related expertise is available from the NiOptics Corporation of Evanston, Ill.

The optical distribution channels 16 permit the transportation of light and may include Prism Light Guides (PLG) and/or fiber optics.

A PLG is a large aperture hollow-tube-like fiber. When used for illumination, a mirror is placed at one end of a PLG tube and a light source at the other. As light reflects back and forth a certain amount is dissipated with each pass through the walls of the tube, creating a uniform glow.

By treating the PLG tube as a light transporter, and allowing light to emerge at one end of the tube instead of being reflected back and forth along its length, a high light delivery efficiency can be attained. Since light entering and exiting the PLG is collimated to within the material's reflectance angle, luminaries placed at the open end of the tube, regardless of whether they are surface mounted, recessed, or pendant mounted, should attain a very high efficiency in their redistribution of the collimated light. Currently available transporter/diffuser grade exhibits about 80% efficiency at a length to aperture aspect ratio of 40, when utilized solely as a transport device. This limits the complexity of application in which commercially available PLG can be applied, because over a length of transport of only 40 meters the diameter of the tube becomes a gross architectural imposition if any realizable efficiency is to attained. The PLG may be designed to double as an HVAC or heating duct, however, permitting longer transport distances. Higher transmissivity grade PLG will make light transport more feasible by reducing aperture diameters, increasing transport length, and increasing transport efficiency.

Fiber optics present great potential for the low loss transport of illumination in buildings. Transport losses in relevant types of fibers remain very low and isolated to very specific regions across the entire visible (and IR) spectral ranges. One difficulty that has been encountered in the use of fiber optics is the problem of coupling the illumination into the fiber, but this may be improved by the use of an energy transfer as opposed to image transfer optical coupling process. Unlike PLG, fiber transmission is not aspect ratio dependent; the amount of attenuation over the length of fiber transmission is independent of the fiber aperture's diameter. Theoretically, very large concentrations of illumination can be transported in fibers over long distances with nominal attenuation. The costs in installations will reflect optimizing the amount of illumination each fiber carries with the capacity of the luminare that it is coupled to, to distribute the illumination within desired visual parameters.

The degree to which architectural lighting design is impacted by these developments will be largely incumbent upon the visual objectives of the system designers. Given the new flexibility of the medium, centralization could extend the bounds in which aesthetics are expressed. For example, by changing the beam spread and other characteristics of the fixture that modulates the light from the illumination network, a designer may either "pour" or "sprinkle" light into a space to achieve a desired effect. While one motivation in the development of this alternative method for building illumination is reducing energy consumption in buildings, a case can be made by lighting designers who feel their design objectives are compromised by availability of limited product types, or by low cost fixture substitutions that can take the place of specified fixtures in actual construction practice. It should be realized that the luminance of all current lamp and fixture combinations can be emulated through either or both types of transport methods being proposed. If desired, therefore, the end result could be virtually indistinguishable from conventional installations, except for perhaps improved color reconditioning. There will be extended control over luminance in the space. As any given percentage of total building lumens can be coupled into individual fibers or trunks of hundreds of fibers, flexibility in amount of and location of luminance should extend the palette by which occupant and designer illumination objectives are met.

The complexity of lighting fixture constructions 18 may be simplified due to the reduction in the number of operations it will be designed to perform. Fixtures should not need to undergo UL or OSHA testing and approval because no electricity is required at luminare location for lamp operation. Fixtures will no longer need structural reinforcement to support ballasts, since ballasting is centralized. Fixture construction will be further simplified by the elimination of the requirement for heat dissipation.

Since illumination entering a room from a fiber or PLG transporter emerges at a beamspread dictated by the numerical aperture of the transporter, all lumens appearing at a room interface enter a room. Imaging lenses, reflectors, translucent materials, and/or nonimaging optic elements will further tailor the distribution characteristics of the emitted light, but they will introduce negligible losses, since the illuminance is directional. Another way of saying this is that fixture efficiencies approach 100%, and that aesthetics and distribution characteristics become the primary parameters relevant to fixture selection. As a lighting design paradigm, light distribution characteristics can be readily changed by interchanging fixture lenses to accommodated changes in mood or building function.

Radiation (illumination/heat) sources 26 such as xenon arc or HMI metal halide (Osram) lamps have a high percentage of radiant flux, ideal spectral characteristics, and low conduction losses. Efficacious for these lamps approach 100 lm/w and their lumen output can be as high as 400 or even 800 energy saving fluorescent tubes. By engineering for the optimization of a single reflector, instead of the hundreds of source reflectors it replaces, the overall proficiency at which the system operates may be improved. The radiation emitted across the very small arc of these sources lends itself well to precise optical control. The factor limiting the usable lumen output of individual sources, however, is the density (intensity) of the source's emitted light. Future lamps will need to get smaller and brighter to drive the optical system to adequate luminous levels. The optical system at best can only reconstitute this intensity at the fiberoptic coupler. Light must be emitted by the source at roughly the same energy density as that which will be received by the entrance end of the fiber, or roughly 3000 lm/mm$^2$. The current luminance limitation can be circumvented somewhat either transversely and/or longitudinally by clustering sources to constitute a lamp bank so that the energy density at the fiber entrance is composed of superimposed beams. Using a refractive light collector with an index of refraction equal to the index of refraction of the fiber is another method for increasing the energy density by a factor of (the index of refraction)$^2$ beyond that of the luminance of the source. Additional factors such as source longevity and lumen maintenance should also be considered in system design, and it is apparent that centralization of location would accommodate the proper lamp and fixture lumen maintenance and depreciation regimens that would result in reduced light loss factors. Since HMI sources closely emulate the solar spectrum, they may meld imperceptibly when a supplemental solar collection strategy is integrated into the hardware of a building's illumination system, however, their lower brightness means they will have to be clustered in order to deliver 2000 lumens to the entrance of the fiber for transport.

Figure 6:
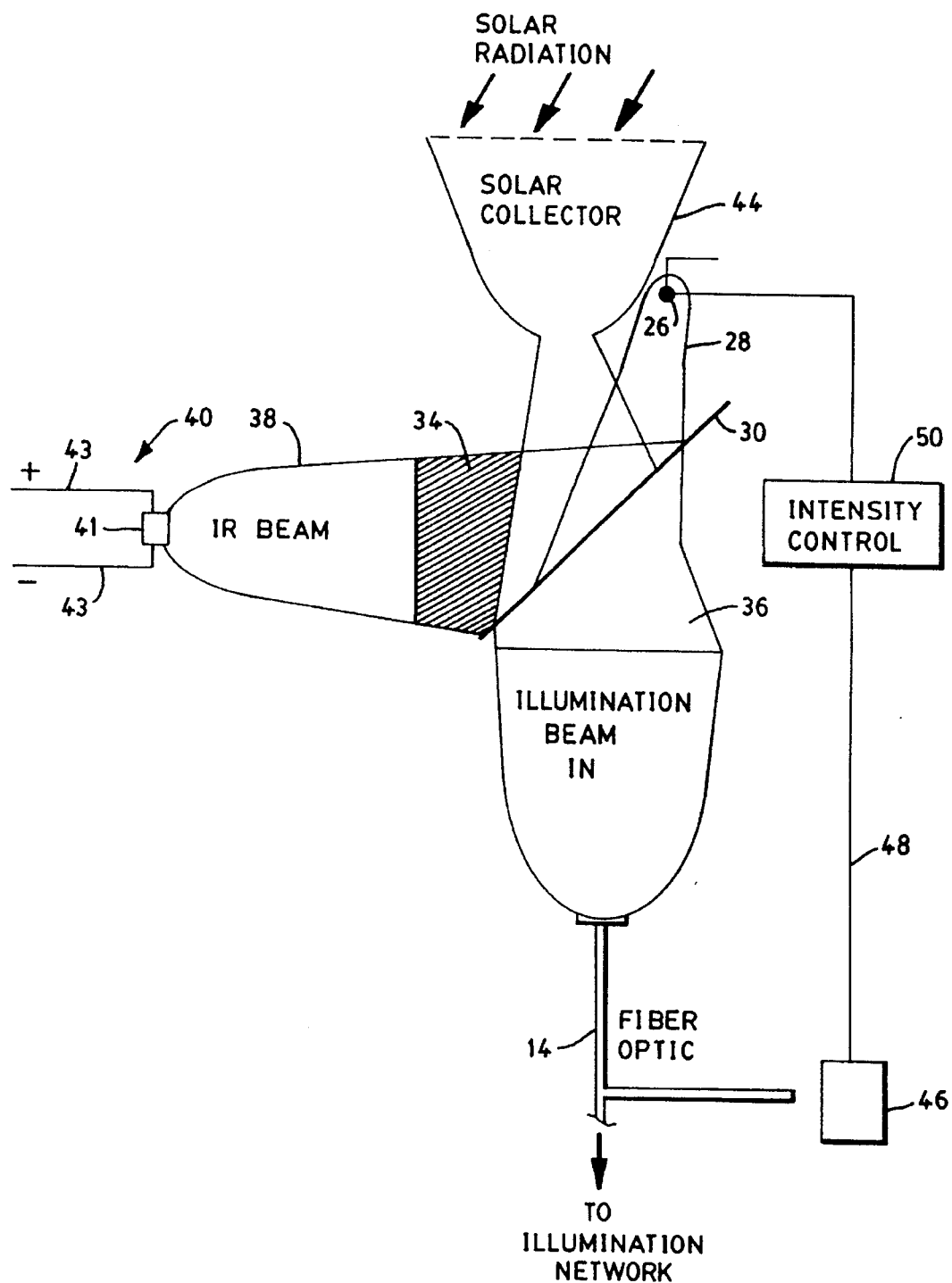
FIG. 6 is a schematic block diagram of an integrated solar/artificial illumination system according to the invention.

Within optical constraints, supplemental solar energy may be provided to the system at the same point as is artificial light. Referring to FIG. 6, a solar collector, which is preferably a nonimaging optic solar collector 44, provides a supplemental beam of sunlight to the cold mirror 30. The cold mirror separates radiation incident upon it (artificial and/or solar) into an illumination beam 36 and a heat beam 34. Energy is recovered from the heat beam at the input of the heat recovery system, (e.g., a photovoltaic cell 41), and provided at its output (e.g., wires 43). The illumination beam is coupled to the illumination network 14. The illumination network provides a small portion of the light that it carries to a transducer 46, which provides a signal 48 that is a measure of the light intensity level within the illumination network to an intensity control circuit 50. The intensity control circuit employs ordinary feedback control principles to maintain a constant desired light intensity level within the illumination network by controlling the magnitude of the power required by the artificial light source 26 in response to the transducer output signal. In this way, during periods of insufficient solar radiation the received solar energy may be supplemented by artificial light in a continuous manner to achieve a uniform light intensity in the illumination network.

In view of a building's reduced thermal load, the illumination system's radiation source may in large part, or even completely, heat and cool the building (cooling could be accomplished via a heat absorption chiller). The supplemental solar system may collect and distribute up to the 60,000 lumens and 0.400 kw of heat that is incumbent upon each square meter of solar collector during peak hours and conditions. This peak period solar supplementation may offset a building's energy load to the point that building illumination, and heat and cooling power, are supplied solarely and excesses are stored, allowing the building to exist in a quasi-generative energy capacity. Furthermore, with perimeter fenestrations collaborating in a similar strategy of heat and illumination decoupling, collection and distribution, the increase in collector surface area of all exterior building surfaces suggests an even stronger likelihood that building energy self-sufficiency could be attained by these means.

Figure 7:
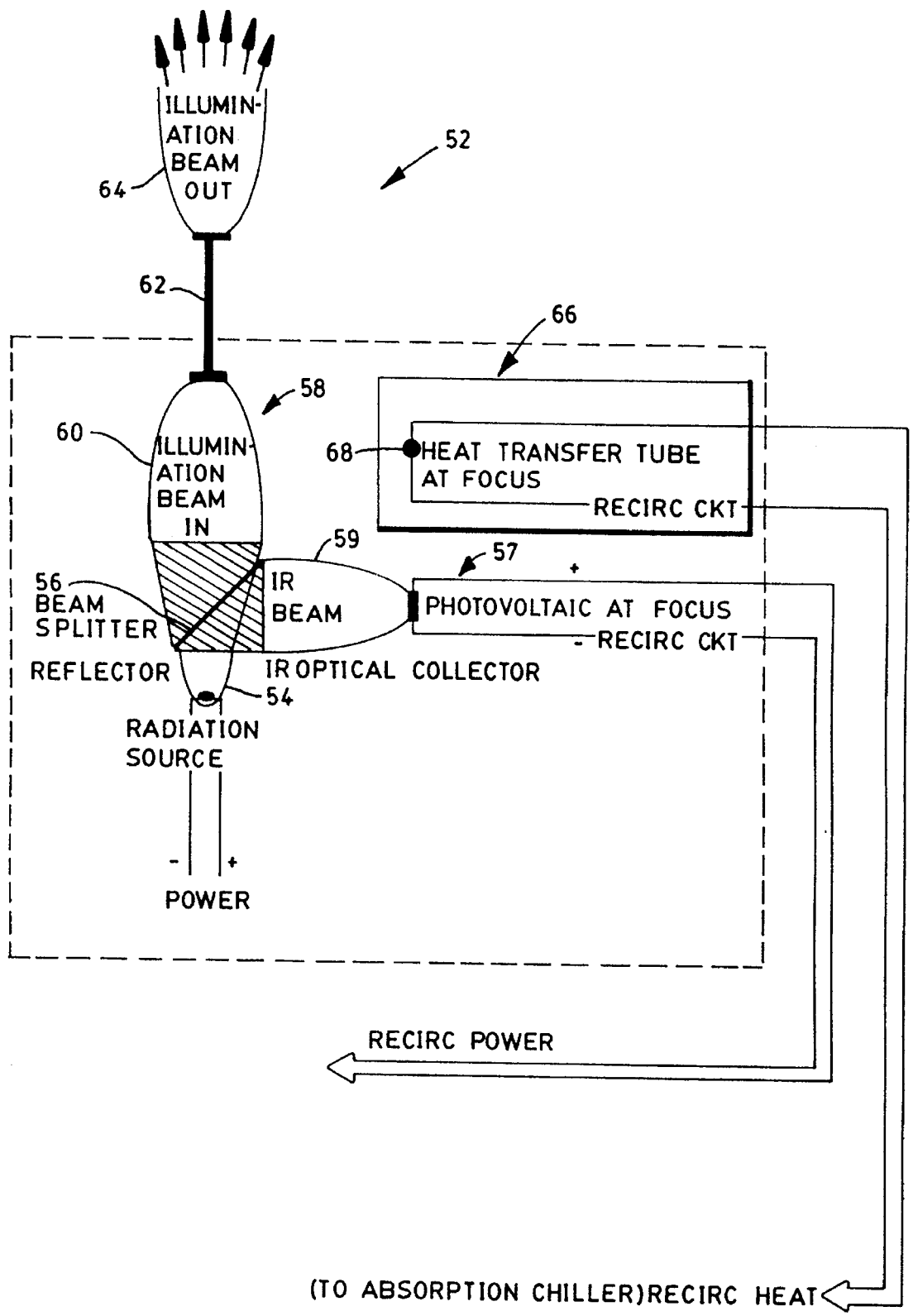
FIG. 7 is a schematic block diagram of a theater lamp embodiment.

Referring to FIG. 7, theater lighting is a particularly useful application for a system according to the invention. This is because theater lighting requires a large amount of light, a low mechanical moment of inertia, and that light typically cannot be other than incandescent, as it usually requires dimming. A theater lamp 52 employing the principles of the invention includes a radiation source 54, a beam splitter 56, a primary heat recovery system 57 and a light distribution path 58, which may include a nonimaging illumination concentrator 60, a light distribution channel 62 and an illumination fixture 64. The illumination channel 62 may include a network of channels and there may be more than one illumination fixture. Alternatively, there may be only a single fixture, in which case the illumination channel can be simplified, or even be removed entirely to provide illumination directly from the beam splitter. Light may be modulated in a variety of ways to achieve a variety of beam edge shapes, crisp or blurred edges, and even or desired illumination distributions across a beam. These effects may be achieved by modulating the illumination beam with shutters, filters, lenses and/or nonimaging optic elements. Nonimaging optics may be particularly advantageous in this area, as they can permit the elimination of lenses, improve uniformity of beam cross-section by superimposing direct and reflected beams, and provide a consequent reduction in cost, weight and size. The light beam may be directed by moving the fiber instead of the entire fixture.

The infrared energy removed from the source beam may be recovered in the form of electricity which may be used to offset the overall electric drain of the system. Alternatively, a heat transfer system 66, which may include a heat transfer tube 68 placed at the focus of the heat collection device 59, may be employed to remove heat energy from the system. This recovered heat may be provided to an absorption chiller for cooling, or be used directly as heat in heating the building. Heat could similarly be fed into fibers. Lower grade fibers would dissipate heat en route, and allow flexibility in the directionality of heat removal.

Figure 8:
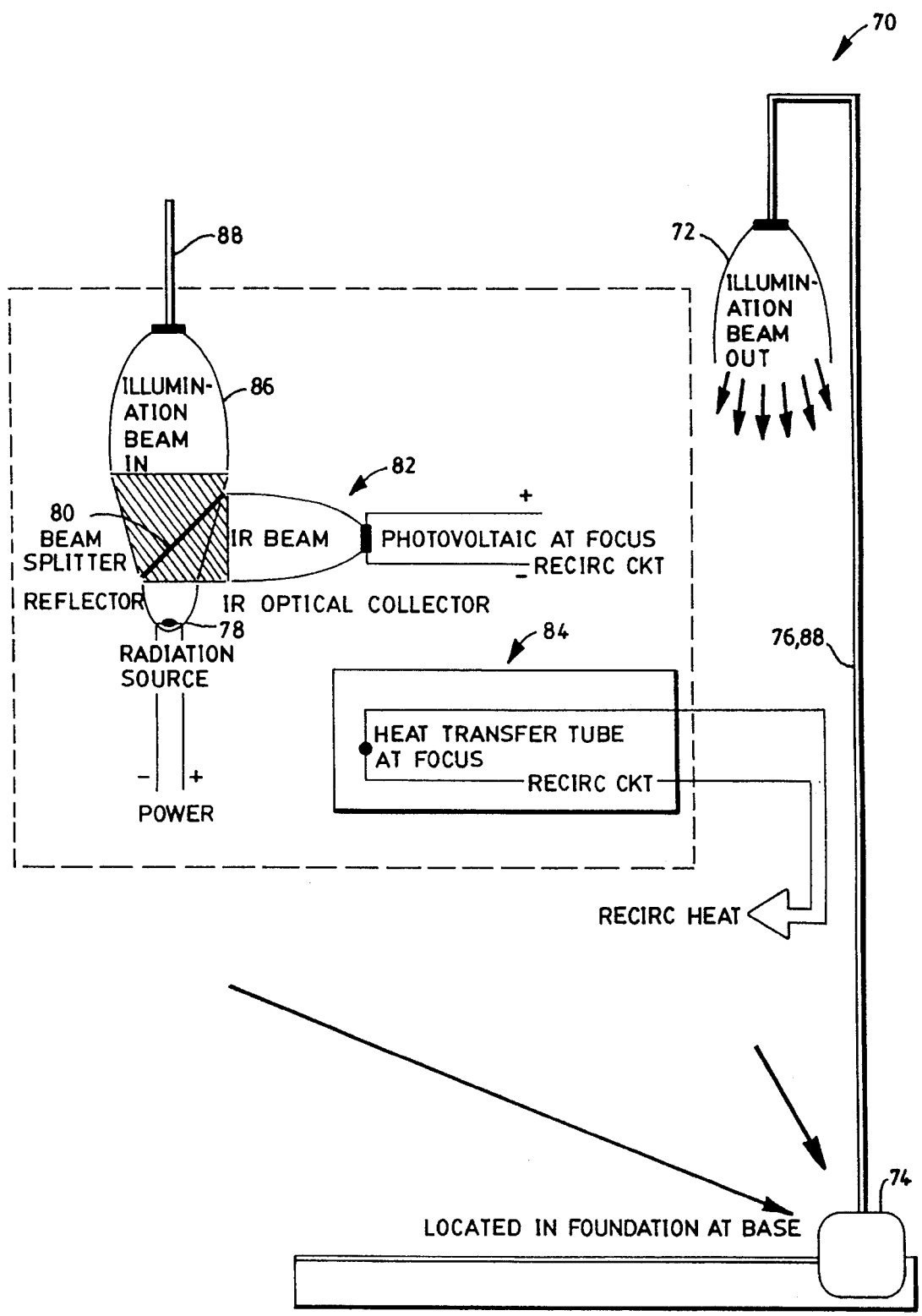
FIG. 8 is a schematic block diagram of a street lamp embodiment.

The system of the invention may also be advantageously used in a street lamp application. Referring to FIG. 8, street lamp 70 comprises one or more lighting fixtures 72 supported by a supporting portion of a cantilevered support structure 76, which includes an optical fiber 88. At the base of the street lamp supporting structure there is a foundation portion 74 that anchors the street lamp. This foundation portion may include a radiation source 78, a beam splitter 80, and a heat recovery systems (82 and/or 84). The visible light 86 is coupled into the light channel 88, and the recovered heat may be used to offset the power required by the lamp. In single-lamp embodiments, heat recovery may not be economically warranted until high brightness sources are developed, but the infrared energy may need to be decoupled in order to protect the optical fiber 88. The decoupled heat beam could be used to run a fan for dissipating convection/conduction loses, or ushered away by launching it into dedicated fibers. If a small portion of the visible spectrum is included, the heat beam could be used for low luminance applications such as pole markers, signage, or for other low luminance design concepts.

The fixture or fixtures 72 required for this street lamp simply couple the light from the light channel into the area to be illuminated, and may therefore be light, compact, and present a low wind load. This will permit reduced overturning forces at the base of the street lamp, and a lessened support structure 76. This street light is also simple to maintain, as there is no need to access the lighting fixture, which may require special equipment and/or blocking of traffic and may even need to be scheduled at night. If multiple lamps on one or more support structures are serviced by the same source, maintenance requirements are further reduced.

Figure 9:
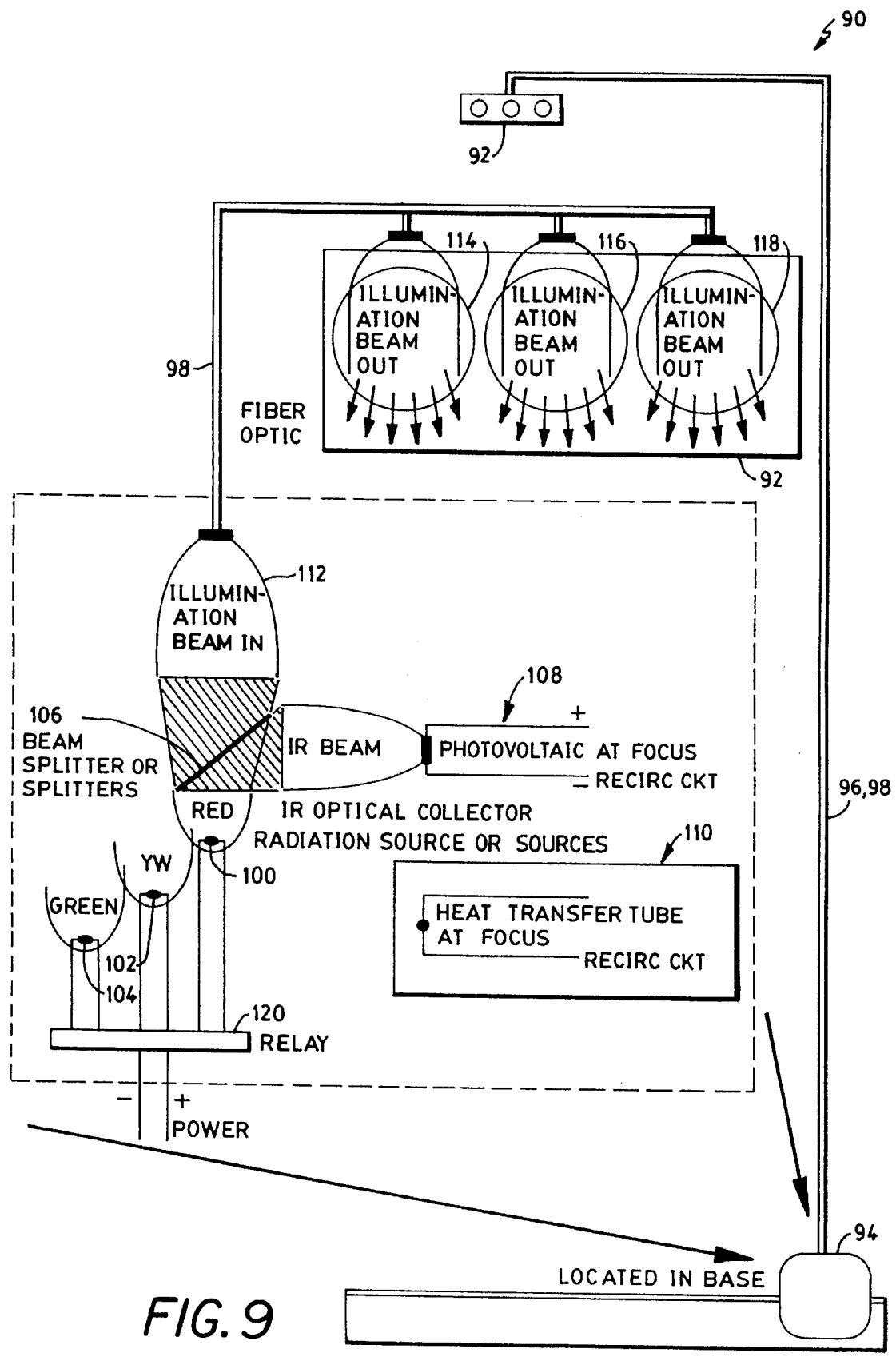
FIG. 9 is a schematic block diagram of a traffic lamp embodiment.

Referring to FIG. 9, a traffic signal embodiment 90 includes traffic signaling lamps 92, a support structure 96, which includes a light channel 98, and a foundation or base 94. The base includes a red radiation source 100, a yellow radiation source 102, and a green radiation source 104. These are directed to shine upon a beam splitter or a matrix of beam splitters 106. A heat recovery system may be provided (108 and/or 110). A visible light collector 112 collects light from the sources and provides it to a light channel 98. This light channel channels the light to all three traffic light fixtures 114, 116, 118. A relay 120 selectively energizes one of the three radiation sources in order to provide the appropriate color light for the traffic signal. The street lamp may also be constructed using separate light channels and monochromatic sources with filters (gels), or single lamp with colored filters and a selective shuttering system, which may include solid state shuttering elements. Even more than the street lamp, the traffic signal will benefit from improved safety, reduced structural requirements and lower maintenance costs. Solar supplementation may also be implemented in these embodiments.

Figure 10:
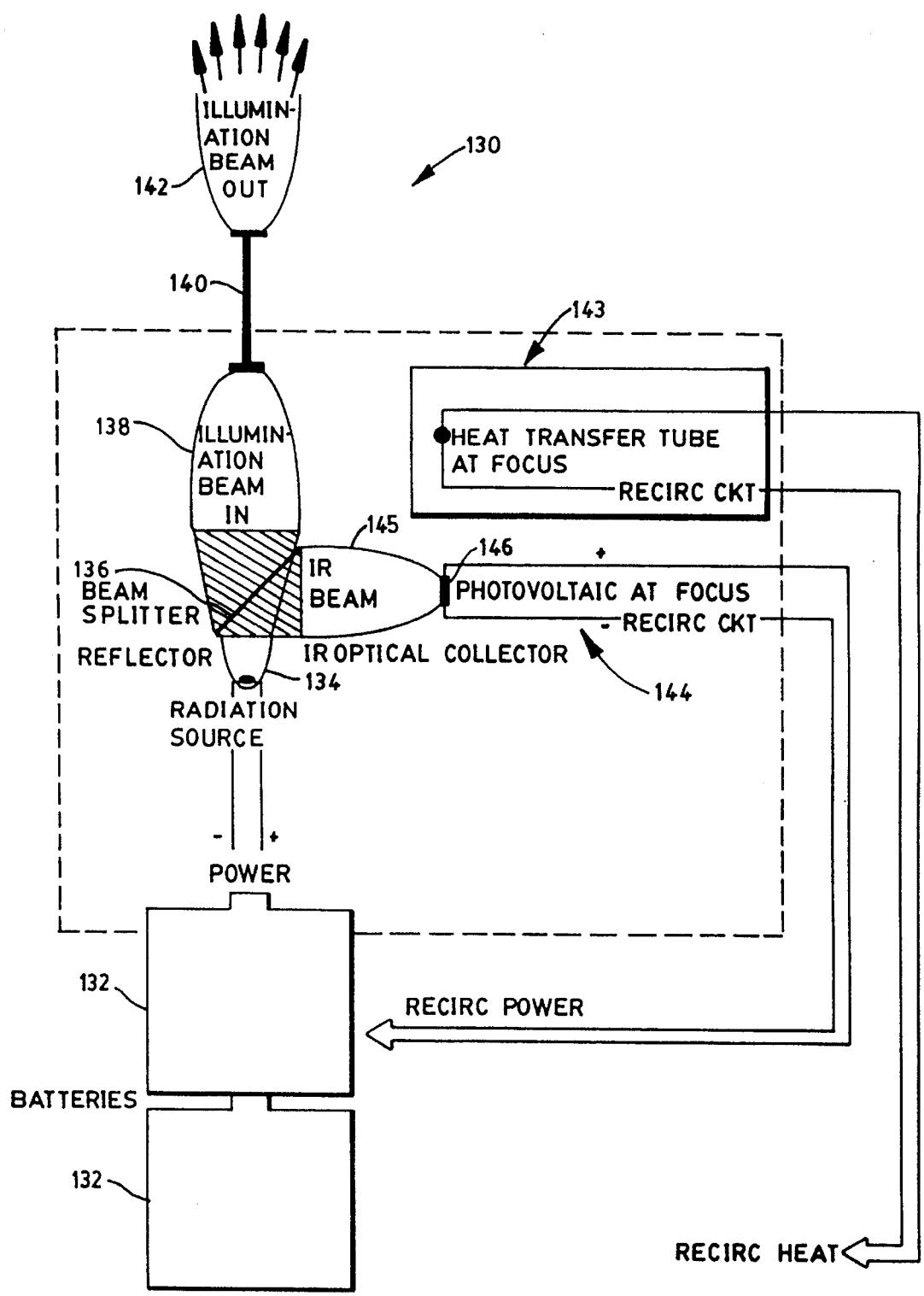
FIG. 10 is a schematic block diagram of a portable lamp embodiment.

Referring to FIG. 10, a portable light source 130 includes batteries 132, a radiation source 134, a beam splitter 136, a visible light concentrator 138, a light channel 140 (which may simply be a lens), and a light fixture 142. The beam splitter 136 separates out infrared energy 145 from the radiation source that is recovered by a primary energy recovery system 144, which may include a photovoltaic cell 146. Energy recovered may be used locally as heat or otherwise. For example, energy derived from this primary energy recovery system may be recirculated to offset drain on the batteries. The heat derived from the infrared beam in the alternate heat recovery system 143, which may include a heat transfer tube, may also be provided to the batteries. In cold weather this may provide a more hospitable environment for operation of the batteries. This portable embodiment is particularly useful in marine applications, where wiring is subject to corrosion and short-circuiting, and where power efficiency is important. It will of course be apparent to those skilled in the art that elements of the different embodiments may be combined in various ways without departing from the spirit of the invention, to produce, for example, a portable theatrical light.

Figure 11:
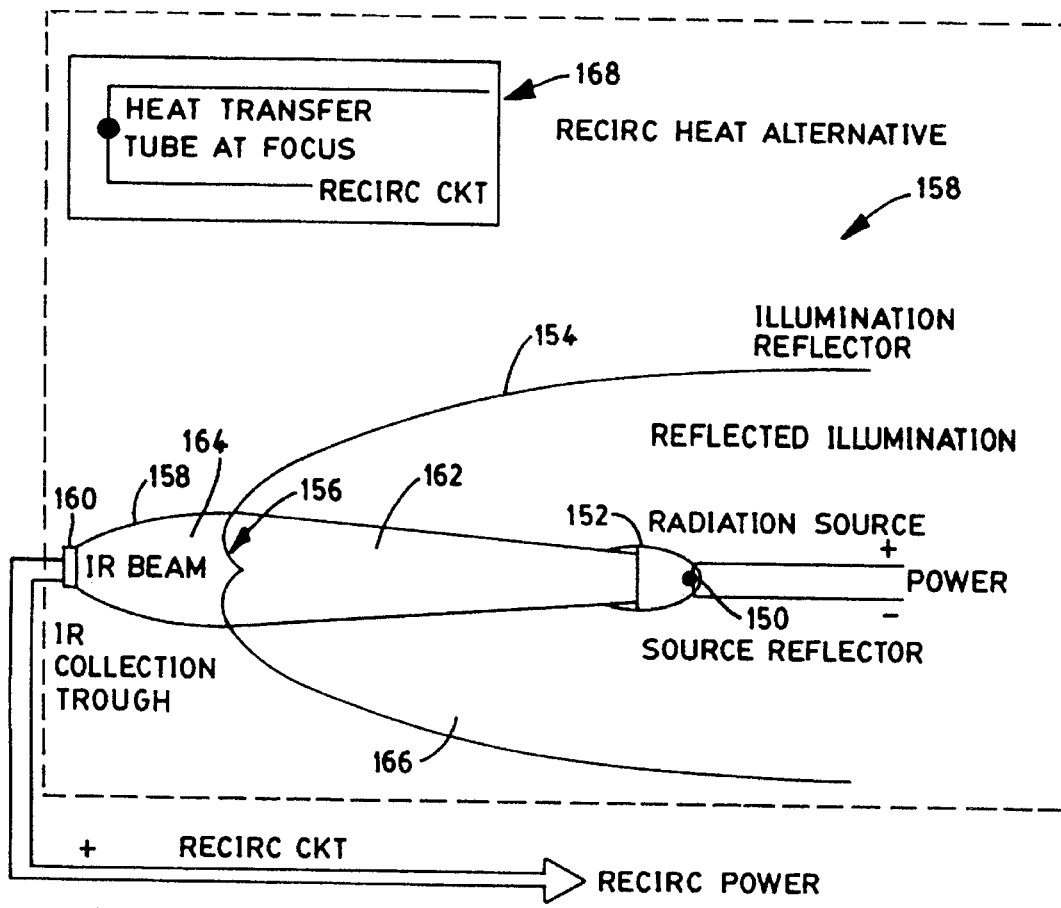
FIG. 11 is a schematic block diagram of an alternative embodiment of the centralized illumination/heat recovery source configuration.

Referring to FIG. 11, an alternative embodiment of the centralized illumination/heat recovery module includes a radiation source 150, a source reflector 152, and an illumination reflector 154. A beam splitting portion of the illumination reflector 156 is designed (e.g., selectively coated) to pass infrared energy 164 from the source beam 162 and to reflect an illumination beam 166. In this embodiment, the beam splitter is essentially integrated into the tip of the illumination reflector. Energy may be recovered from the infrared beam in a primary heat recovery system, which may include a photovoltaic 160, and/or in an alternative heat recovery system 168, which may include a heat transfer tube. Radiant heat could also be launched into fiber optics for removal. The beam splitter is shaped to minimize inter-reflections between the tip of the reflector and the source and to direct reflected illumination out of the fixture, which explains the slight cusp in the illumination reflector 156. Illumination reflector 156 is shaped to provide a desired beamspread and luminance level for illumination leaving the unit. The trough is shaped to optimize the concentration of energy received from the source reflector through the beam splitting portion of the illumination reflector. The source reflector, the illumination reflector, and the IR collection trough 158 may all be non-imaging optic elements. This compact arrangement minimizes the amount of stray light exiting the illumination reflector, may be supplied as an assembly, and may be evacuated. When used in the form of an evacuated assembly, the reflective coatings need not be protected by protective coatings.

Figure 12:
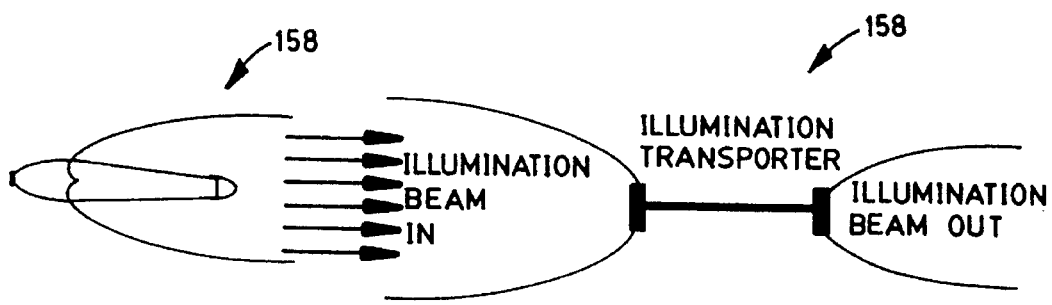
FIG. 12 is a schematic block diagram of an illumination system employing the source configuration of FIG. 11.

Referring to FIG. 12, the source assembly 158 may be used to provide illumination to an illumination network, such as the one shown in FIG. 12 158. With this source configuration, it may be preferable to recover solar heat using a separate beam splitter.

Figure 13:
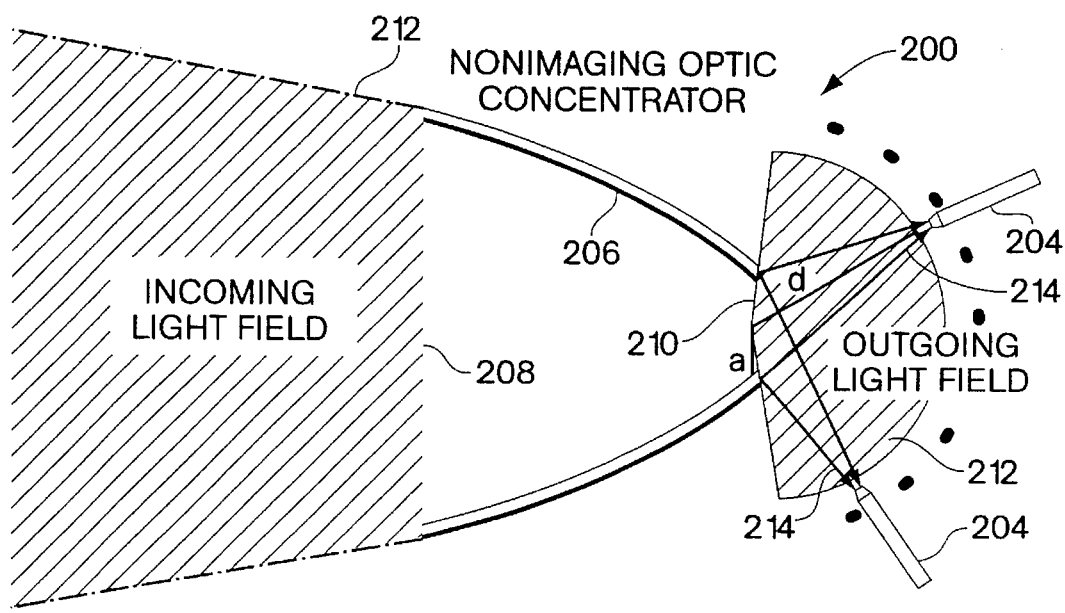
FIG. 13 is a diagrammatic section illustrating collecting incoming light from a source, concentrating the light and distributing it to a plurality of optical fibers.

Referring to FIG. 13, an embodiment of an optical coupler 200 for collecting incoming light 202 from a source, concentrating the light and distributing it to a plurality of optical fibers 204, includes a nonimaging optical concentrator 206 having an entrance aperture 208 for accepting incoming light field 202, and an exit aperture 210 for producing an outgoing concentrated light field 212. The plurality of optical fibers 204 (only two fibers are shown here for clarity) are arranged to accept light from the outgoing light field 212. In one embodiment, the entrance apertures 214 of the optical fibers 204 are close-packed together forming an approximate hemispherical surface encompassing the outgoing light field 212 to maximize light collection by the fiber optic apertures. Alternatively, the fibers can be arranged to form an approximate parabolic, helical, or other volumetric or curved surface.

Generally, a fiber optic internally reflects light at the interface between its core (inner) and cladding material (outer) with great accuracy and precision such that approximately 99.9% of light is reflected back into the fiber with each bounce off of the core/cladding material interface. This is true for all angles of incidence within the fiber's acceptance range, which is typically less than approximately 27°. As expressed by its numerical aperture (NA), which is simply the sin function of the acceptance angle, the range of acceptance angles 0° to 90° can be expressed conveniently on a scale from 0 to 1. Another property of optical fiber, the core packing fraction, is the amount of cross sectional space occupied by the fiber core material in a bundle of fibers relative to the area occupied by cladding material and by interstitial voids (area between adjacent packed fibers). That is, the core packing fraction losses consist of two parts:

(1) interstitial void loss, which is the cross-sectional space left over by packing the core cylinders; and
(2) core/cladding ratio loss, which is the percentage of cross sectional area taken by the cladding around the perimeter of the core and the percentage of light consequently lost by not being coupled into the core.

Typically, light is concentrated and launched into fibers with converging lenses or parabolic or elliptical optical reflectors. In these instances, some of the light emanating from a source is reflected and focused to within a small focal area that is filled by the end of the fiber. The concentration of light using this method cannot exceed the fiber's numerical aperture requirements if maximum concentration is to be achieved. An image of the source appears at the focus, and, consequently across the fiber end's face. A large percentage of light is lost because the source reflector receives only a small portion of the source's output. Most light is radiated in directions other than toward the source reflector. At maximum concentration even more light is lost due to rays exceeding the fiber's acceptance angle.

A non-imaging optical collector/concentrator can be used in lieu of a converging lens or other optical system. One method is to fill the exit aperture of the concentrator with one single fiber, thereby directly launching the concentrated light into the fiber. While there are no core packing fraction losses associated with launching into a single fiber, the expense of fibers with large diameters can be disproportionately higher than smaller diameter fibers packed together.

Radiation concentrated by the non-imaging optic collector/concentrator to near the thermodynamic limit is emitted directionally. The more sharply restricted the beam divergence of the incoming light, the higher the level of achievable concentration for a concentrator of a given size. In order to contain the emittance of the optic collector/concentrator to within the acceptance angle of the fiber filling the exit aperture, the concentration ratio of the collector/concentrator will typically need to be reduced. This reduction in concentration ratio no longer utilizes the inherent advantage of non-imaging optics for concentration and requires a larger diameter fiber which is economically less advantageous.

When fiber optic bundles are used instead of individual fibers, there is a savings in materials cost but at the expense of sizable losses in optical energy efficiency due to core packing fraction losses, and the likelihood of thermal breakdown by light energy trapped and absorbed within the interstitial voids of the fiber bundle. Even with smaller bundled fibers, the same angular acceptance restrictions persist, only now worsened by core packing losses. Utilizing a non-imaging collector for its maximum concentration potential sends a large amount of light outside of the fiber's maximum acceptance angle, typically about 27°. So while there can be higher concentration in smaller fiber diameters, there can also be large acceptance angle losses in addition to the packing fraction losses.

Referring again to FIG. 13, if fibers are hemispherically arranged around the exit aperture 210 of a non-imaging optic collector/concentrator 206, instead of packed into a planar bundle, essentially all angles of emitted light in emittance light field 212 will be accommodated by one fiber 204 or another. In this way the light coupler 200 can launch the incoming light field 208 into fibers 204 and still not exceed an individual fiber's numerical aperture, i.e., each fiber's numerical aperture subtends the exit aperture of the concentrator.

Individual fibers 204 can be positioned a distance d from the exit aperture 210 such that the emittance is within the fiber's field of view. For example, for an exit aperture diameter of ($2a$) 1.5" and a fiber's numerical aperture of 0.45 ($\phi$crit=arcsin 0.45=27°). The maximum acceptance angle of the fiber is 27° and the minimum distance d that the fiber end can be placed from the exit aperture is determined by tan 27°=0.5=(a/2)/d=0.75/d; d=1.5". A fiber placed too close to the exit aperture will not couple all incident light into the fibers, whereas a fiber placed too far from the aperture will couple all incident light but is unnecessarily restrictive.

If all source radiation is managed, this approach to coupling light into bundled fibers can improve the energy performance of the fiber optic illuminators up to the limit of core packing fraction losses. This technique involves a number of fibers so core packing fraction losses are still an important factor to be considered. Such core packing fraction losses may require limiting the source's magnitude to within tolerable thermal limits to compensate for radiation trapped and absorbed within the fibers interstitial voids.

Figure 14A:
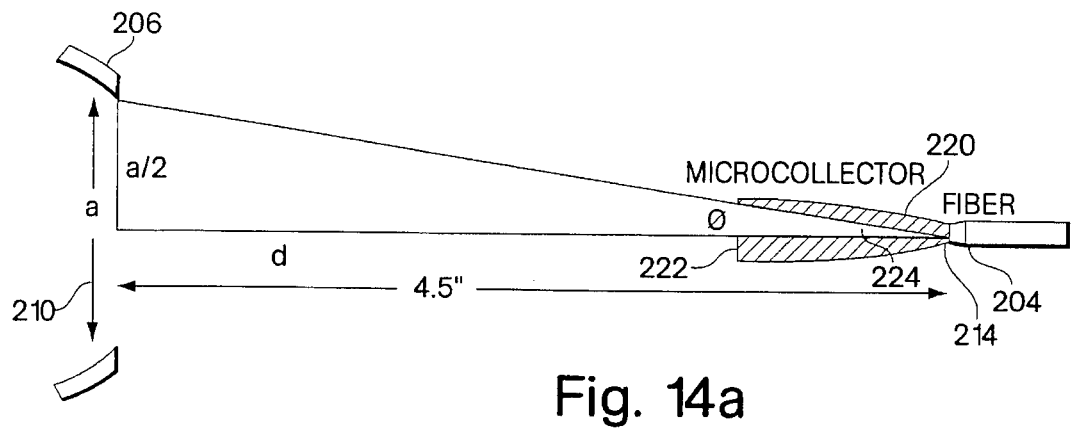
FIGS. 14a–14c are diagrammatic sections of embodiments of this invention for coupling light from a particular type of source into a microcollector of this invention.
Figure 14B:
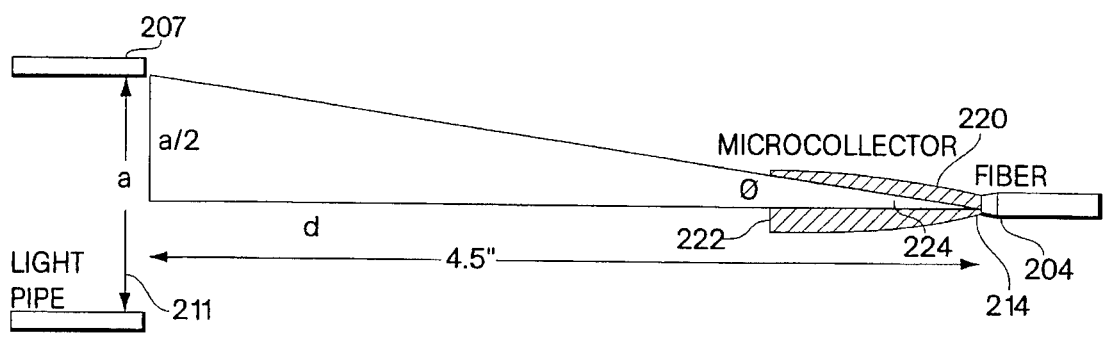
Figure 14C:
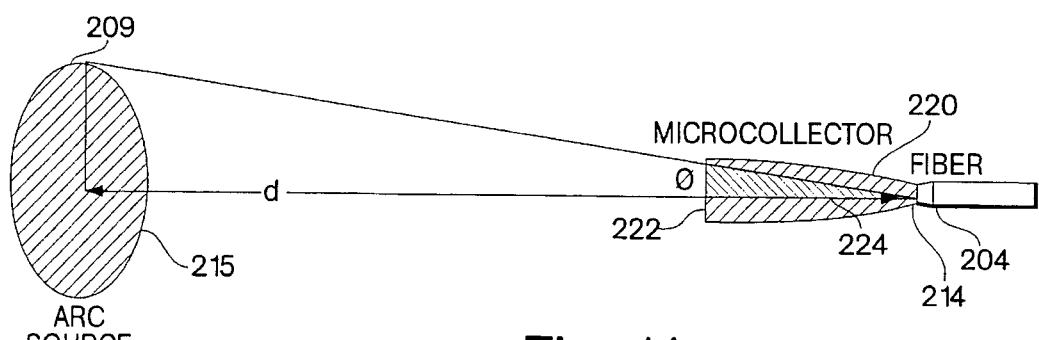

FIGS. 14a–14c show embodiments of this invention including non-imaging optical concentrator 206 (FIG. 14a), a light pipe 207 (FIG. 14b) or an arc source 209 (FIG. 14c), and a non-imaging optical microcollector 220. Microcollector 220 has an entrance aperture 222 for receiving concentrated light output from the exit aperture of the source, such as exit aperture 210 of the non-imaging optical concentrator 206, exit aperture 211 of the light pipe 207, or exit aperture 215 of the arc source 209. Microcollector 220 includes an exit aperture 224 coupled to the entrance aperture 214 of a fiber optic 204.

Microcollector 220 can be configured as a non-imaging optical collector/concentrator that emits radiation constrained to emittance angles of less than $\pi/2$, which are a subclass of the family of non-imaging optics that subscribe to the equation $C=(n \sin\phi/n' \sin\phi')^2$. In order to emit radiation at angles less than $\pi/2$, the non-imaging concentrator is biparabolic along much of its length and conical near its exit aperture. Non-imaging optical principles permit determination of such a collector shape that would concentrate to near the theoretical maximum in consideration of the emittance angular constraints. In the case of the micro collector 220 having a fiber optic 204 coupled directly to its exit aperture 224, illumination can be effectively coupled to the degree that emittance is constrained to within the fiber's numerical aperture.

For example, for a microcollector 220 having a 2.2 mm entrance aperture diameter and 800 micron exit aperture diameter (which fits directly onto the end of an 800 micron diameter core fiber optic), the radiation exiting the microcollector 220 would require a divergence angle $\phi'$ constrained to within 27° for direct coupling to the fiber (i.e., all light constrained within the acceptance angle of the fiber). Such a constraint would stipulate that radiation entering the microcollector be constrained to an angle $\phi$ of approximately 9.4° at a distance d of 4.5" from the exit aperture 210 of collector 206, or similarly divergent radiation. In this case, the microcollector 220 provides an additional second stage concentration of 7.75.

Figure 15:
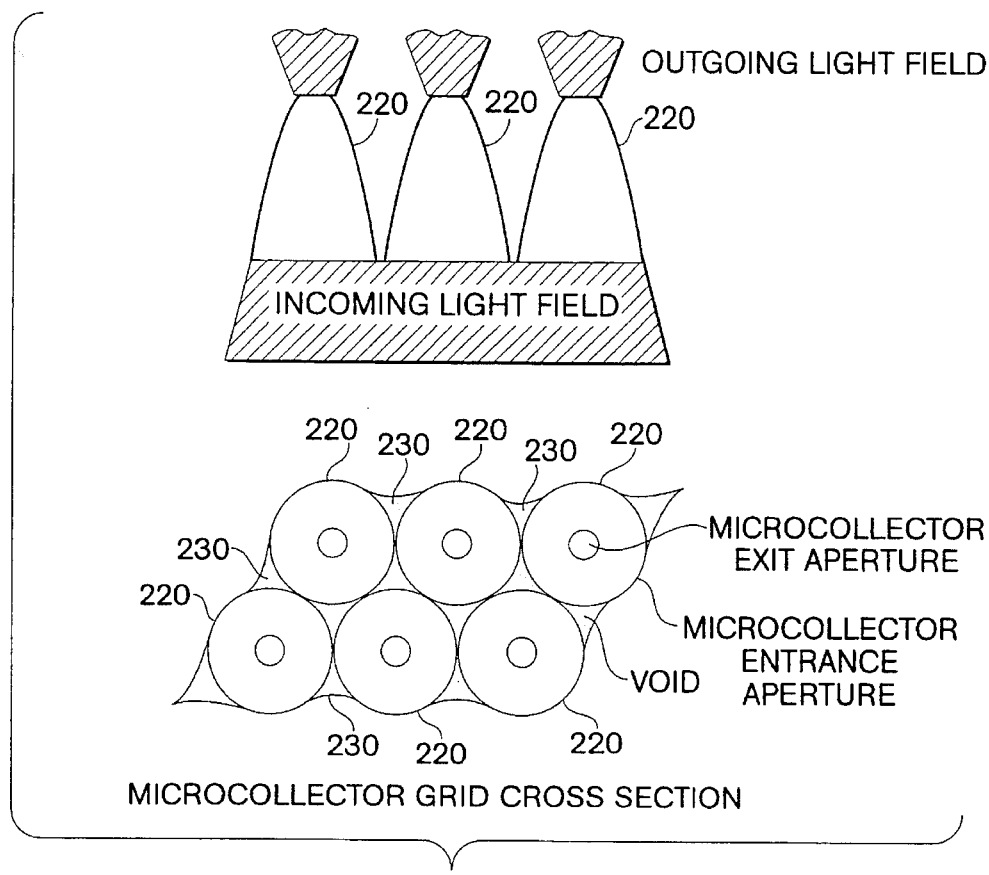
FIG. 15 is a diagrammatic section showing a plurality of microcollectors packed adjacent to each other.

FIG. 15 shows a plurality of microcollectors 220 packed adjacent to each other, similar to packed optical fibers. When microcollectors are packed in this manner, they have interstitial void losses 230 similar to that of fibers, amounting to at least about 9% of the cross-sectional surface area for the packed microcollectors.

Figure 16:
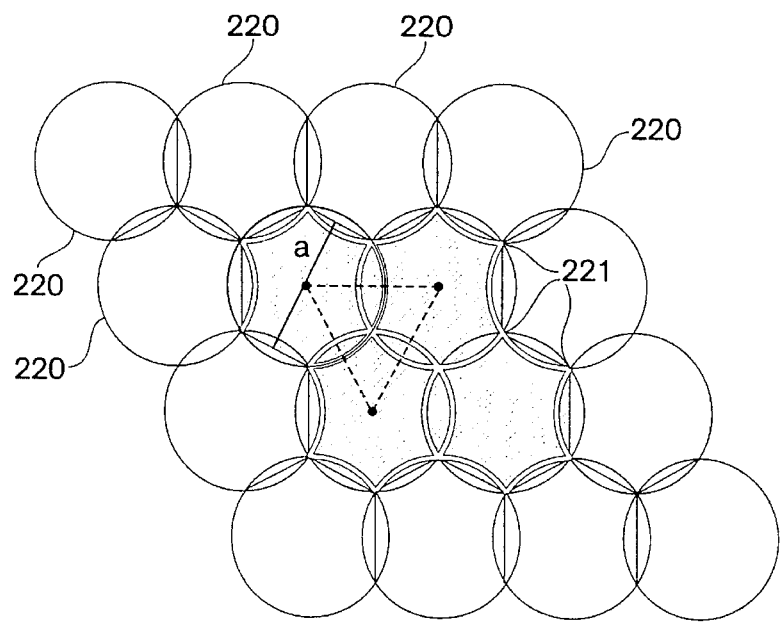
FIG. 16 is a diagrammatic section showing how surfaces of the microcollectors are overlapped near the entrance apertures.

Referring to FIG. 16, if the surfaces of the microcollectors are overlapped near the entrance apertures, the packing fraction loss can be circumvented. However, such overlapping requires decreasing the length of each microcollector 220, which in turn increases the non-imaging optic's acceptance angle and thereby lowers its maximum concentration. Microcollectors 220 can be repeatedly merged in this fashion, resulting in a honeycomb-like grid. The centers of the microcollectors form an equilateral triangle with each microcollector becoming a paraboloid extruded within a hexagon. Each microcollector 220 is the shallowest at the place of greatest truncation, and spires 221 emerge at the diagonal cross-sections, much like the spires that result at the overlapping joints of cathedral vaults.

As an example, for the non-imaging optics described here, angular and length values for the overlapped microcollectors can be found from $$L_t = \frac{a'(1 + \sin\phi)\cos(\phi_t - \phi)}{\sin^2 1/2(\phi_t)}$$

where $L, \phi$, and $a$ are the length, acceptance angle, and entrance aperture diameter of the untruncated optic, respectively, and $L_t, \phi_t$, and $a_t$ are the length, angle subtended, and entrance aperture diameter of the truncated optic. Microcollector 220 dimensions can be determined for collimated (slightly divergent) radiation emitted by a directional source placed at an effectively infinite distance away. This scenario changes for an adirectional source ($2\pi$ sr) placed a short distance away.

Figure 17A:
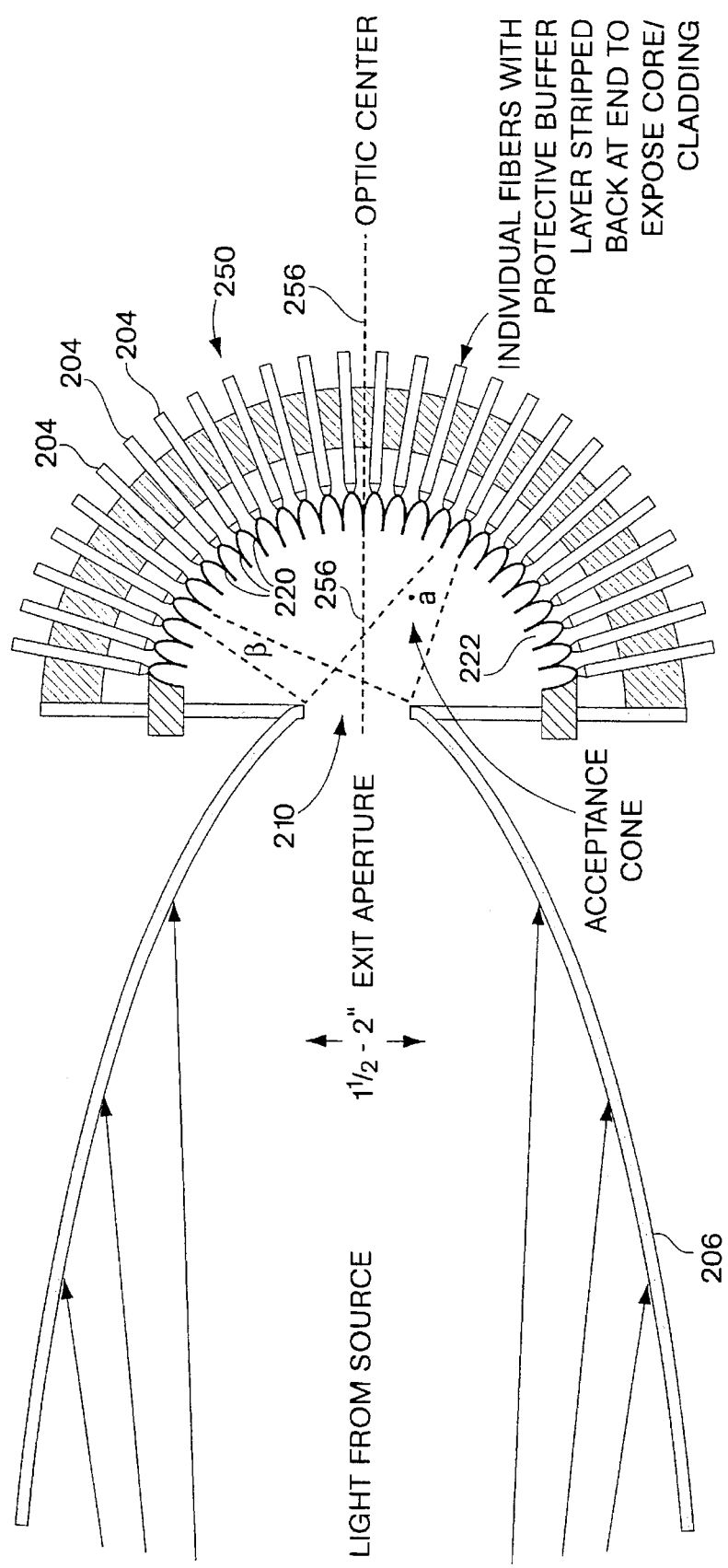
FIG. 17A is a diagrammatic section showing how a microcollector grid is formed on a hemispherical surface wrapped around the exit aperture of a non-imaging optical collector/concentrator such that the exit aperture lies within each microcollector's field of view.
Figure 17B:
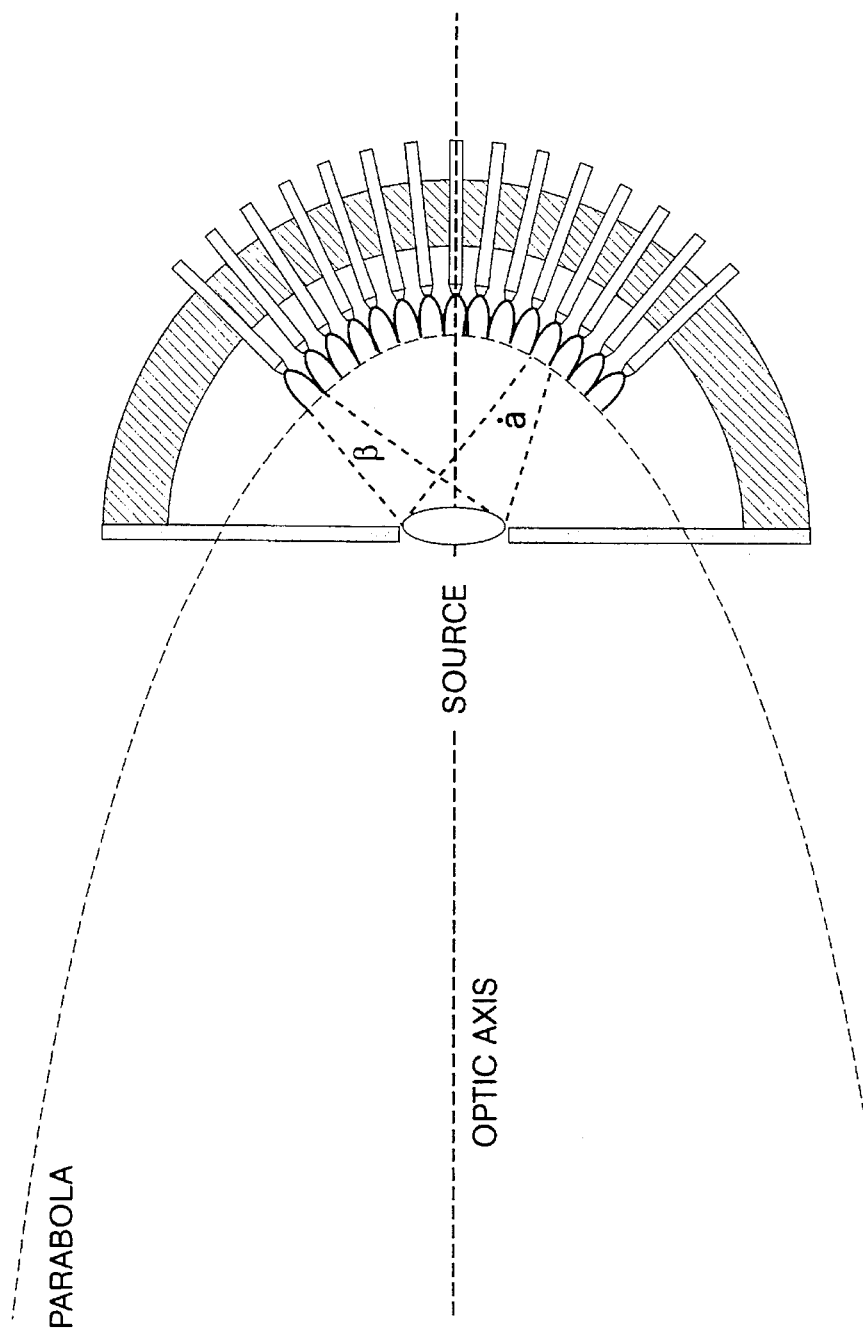
FIG. 17B is a diagrammatic section showing how a microcontroller grid is formed on a parabolic surface wrapped around the exit aperture of a non-imaging optical collector/concentrator such that the exit aperture lies within each microcontroller's field of view.

Referring to FIG. 17A, a microcollector grid 250 can be formed on a hemispherical (or parabolic, as shown in FIG. 17B). surface wrapped around the exit aperture 210 of non-imaging optical collector/concentrator 206 such that the exit aperture 210 lies within each microcollector's 220 field of view. Exit aperture 210 acts as an adirectional source emitting radiation at angles $2\pi$ sr. Exit aperture 210 can also be the output from a light pipe or source. A fiber 204 is affixed to the exit aperture of each microcollector 220. If each microcollector 220 is placed far enough away from the exit aperture 210 so that the light emitted therethrough approximates a point source, the angular divergence of the beam entering each microcollector is reduced, thereby increasing the allowable microcollector concentration prior to encountering constraints dictated by the fiber optic's acceptance angle.

Microcollector grid 250 is mapped onto a hemisphere, or other hollow volume, with the light source (exit aperture 210) at, for example, its radial center. For clarity, only a cross-section of the microcollector grid 250 is shown in FIG. 17. Each microcollector 220 is positioned on the grid at a distance from the exit aperture or source location 210 such that all illumination reaching that microcollector falls within that microcollector's acceptance cone at an angle not to exceed the fiber's 204 numerical aperture after microcollector concentration. The microcollectors 220 at or near the optic center 256 of the hemisphere grid experience the widest initial beam ($\overset{.}{a}$) and, consequently, can concentrate very little light before exceeding its corresponding fiber's numerical aperture. This reduces the usable entrance aperture size of the microcollector. Off-axis microcollectors encounter a less divergent beam ($\beta$) due to the apparent decrease in the exit aperture 210 diameter when viewed off-angle.

The microcollectors receive light flow from the exit aperture 210 of a concentration optic 206, directly from the source, or from the output end of a light pipe. The microcollector cavities can be filled with material having an index of refraction other than unity. This could increase the concentration ratio, and affect other parameters of the microcollectors such as depth and width for any particular set of angular constraints. For example, filling the microcollector (and/or primary collector) cavities with a material matching the index of refraction of fused silica fiber core material (such as fused silica) would allow even higher concentrations of light surpassing the luminance of the source to be propagated via fiber. Fiber optic conductors can include non-imaging optical tapered ends, essentially incorporating a microcollector into the end of the fiber by tapering the fused silica fiber into the desired microcollector shape.

Figure 18:
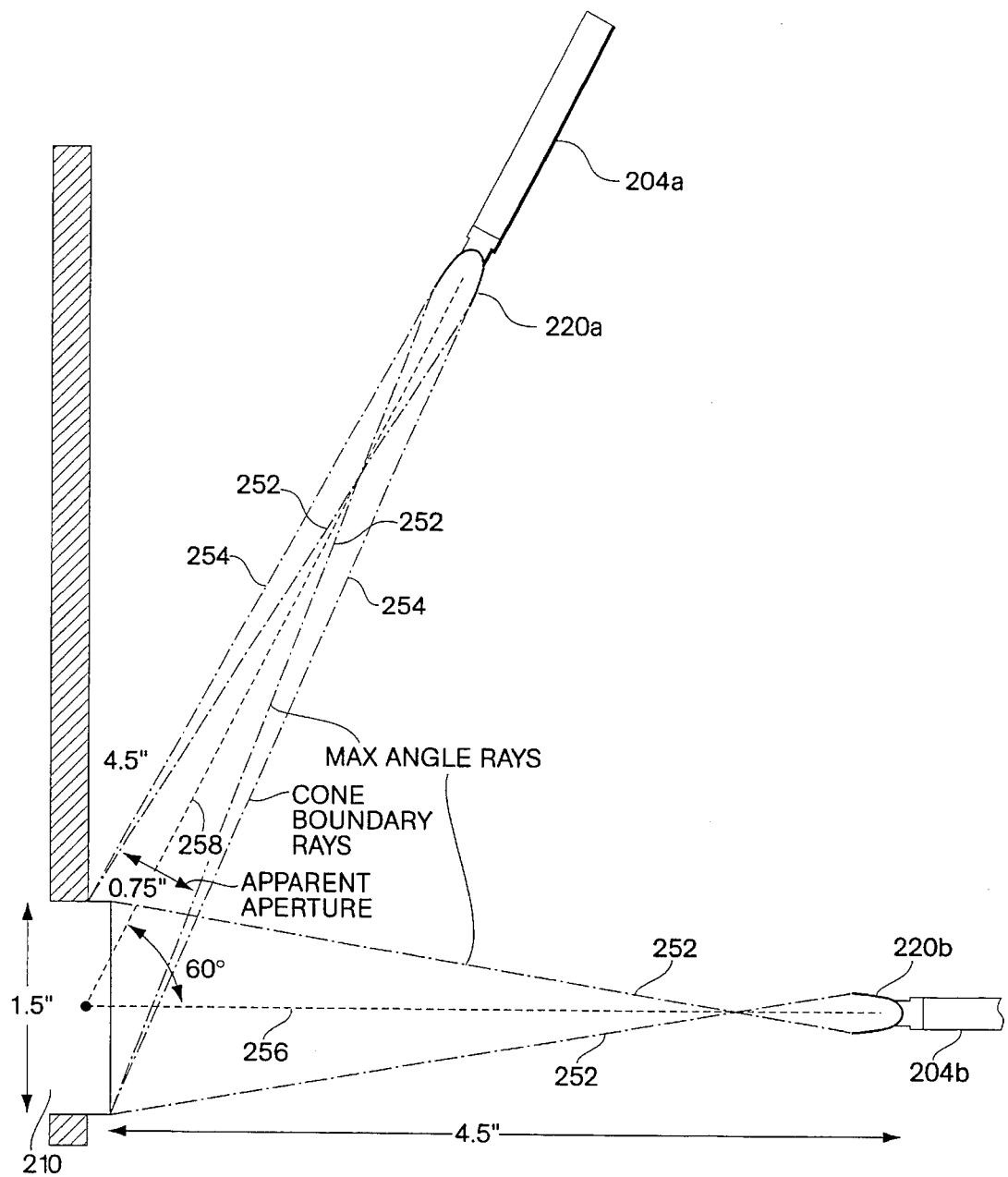
FIG. 18 is a diagrammatic section showing that extreme angle rays differ from cone boundary rays for an optically thin source.

Referring to FIG. 18, for an optically thin source, such as the output of a non-imaging concentrator, extreme angle rays 252 differ from cone boundary rays 254. Extreme outer rays 252 determine each microcollector's depth, and consequently its aperture and acceptance angles. Extreme rays 252 have greater divergence toward the principle optic axis 256. For example, an 800 micron fiber 204a with a numeric aperture of 0.45 can be oriented such that its optic axis 258 is inclined 60° the the principal optic axis 256. For an exit aperture 210 of 1.5", the apparent aperture for microcollector 220a is 1.5" cos 60°=0.75". The maximum semiangle subtended by the inclined microcollector 220a is given by $$Max\ \varphi = tan((0.375")/4.5") = 4.75°$$

which permits microcollector 204a to have a concentration of 3.0 before exceeding the fiber' acceptance angle. At this concentration ratio, entrance and exit divergence, and exit aperture diameter (800 microns), the microcollector entrance diameter is found by substitution.

For an optically thin source, microcollectors inclined away from the optic axis experience smaller incoming divergence than microcollectors near the principle optic axis. For a given fiber diameter, the entrance aperture of inclined microcollectors can be enlarged thus, enhancing the concentration ratio without exceeding the fiber numerical aperture. Similarly, for a given microcollector entrance aperture diameter, smaller diameter fibers can be used for microcollectors inclined away from the principle optic axis. Alternatively, light coupling can be optimized by bringing inclined microcollectors nearer exit aperture 210. Thus, microcollector grid 250 can be paraboloid in shape as opposed to hemispherical. Optimization of grid configurations is the subject of future research.

Referring again to FIG. 17A, the emittance of the non-imaging optic light collector/concentrator 206 behaves like a virtual point source. Concentrated light leaving the plane of exit aperture 210 of collector 206 emits at radiation angles encompassing $2\pi$ steradians, but it is optically thin. In order to collect this light and launch it into individual fibers 204 for, e.g., transport throughout a building, each microcollector 220 in the hemispherical grid 250 places the exit aperture 210 within its field of view.

Because the virtual source is optically thin, differing quantities of light would be coupled into each fiber 204 if the microcollector 220 entrance apertures 222 were to change with respect to their orientation about the principal optic axis 256. Shadowing can become a problem for adjacent microcollectors. The virtual source at the output end of a light pipe tube is also optically thin, and would demonstrate a similar non-uniformity of light coupling.

For example, a deep concentrator with an entrance aperture diameter of 10" and an exit aperture diameter of 0.5" has a concentration ratio of 131 for a 5° off axis entrance beam divergence (10° total conal acceptance). An additional microcollector can provide a supplemental concentration of at least 7.5, for an overall concentration of 982.5 at the optic center, if it doesn't surpass the luminance of the source. However, such a microcollector requires a depth of 65", which is excessive. Introduction of a refractive element positioned within the entrance aperture of the microcollector can increase the effective length of a shorter microcollector by bringing the focal length in from infinity. Additionally, by removing some of the entrance aperture, a considerable reduction in length can also be achieved with very little reduction in concentration.

Light partitioning can be used for efficient coupling of illumination into individual optic fibers for distribution of light, throughout a building. The use of tracking solar collection optics in a stationary application can make the fullest use of nonimaging optics for radiation collection and concentration, without the heliotracking that point focus methods would normally require for maximum concentration of sunlight and solar heat.

The light collector of this invention can constitute an assembly of non-imaging optical concentrators and microcollectors. The light collector should accommodate the maximum divergence of the radiation beam leaving the source, e.g., the sun. Attainable concentration of the light collector is a function of the angular divergence of the source. The greater the collimation of light from the source, the higher the concentration, the smaller the exit aperture, the fewer required fibers, and the more light carried by each fiber for a source of a given magnitude. The rays approaching the optic at its maximum acceptance angle are focused along the circumferential rim of the exit aperture 210 of the 1st stage collector/concentrator 206.

Hollow or filled microcollectors at the fiber ends can be overlapped, improving optical efficiency by facilitating the elimination of core packing fraction losses, which in turn permits the utilization of sources of greater magnitude. By wrapping the microcollector array around the virtual source at the collector/concentrator exit aperture, the system emulates the solar optic condition of a collimated source at an infinite distance away.

For optically thin sources, microcollectors inclined away from the principal optic axis encounter a more collimated beam than the microcollectors coincident to the optic axis, due to the decrease in apparent aperture size.

Figure 19:
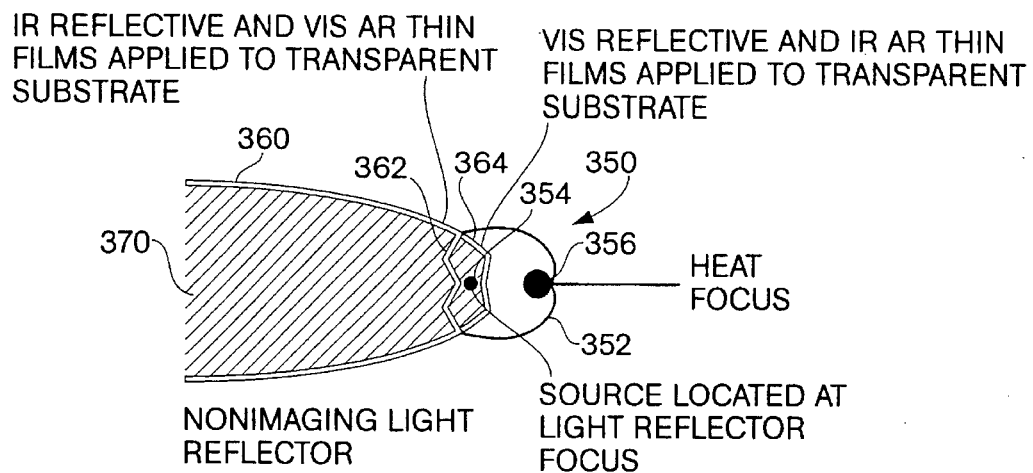
FIG. 19 is a diagrammatic section showing an embodiment of an integral source/concentrator system of this invention including a source, a non-imaging optic light concentrator, and a heat collection trough.

FIG. 19 shows an embodiment of an integral source/concentrator system 350 including a source 354, a non-imaging optic light concentrator 360, and a heat collection trough 352 having a heat focus 356. This configuration resembles a "clamshell" which assumes a nonimaging reflector shape about a source 354 located at its focus. Source 354 is sandwiched between two selective radiation reflectors, an infrared light reflector 362 and a visual light reflector 364. Infrared light reflector 362 reflects infrared light from the source toward the heat collection trough 352, yet passes visual light from the source through to the non-imaging optical concentrator 360. Conversely, visual light reflector 354 reflects visual light from the source toward the non-imaging optical concentrator 360, yet passes infrared light from the source through to the heat collection trough 352.

Concentrator 360 effectively collimates the visual light from the source for output through aperture 370. The angular divergence of the light output from concentrator 360 determined by the conal depth and concentration ratio of the reflector.

The clamshell can be visualized as two light bulbs superimposed, one upon the other. The heat system is a closed system, with light siphoned off and directed out by the light reflector. The clamshell is analogous to the basic module configuration, and is likewise subjected to wider than desirable beamspreads, which potentially counter optimal efficiency.

Figure 20:
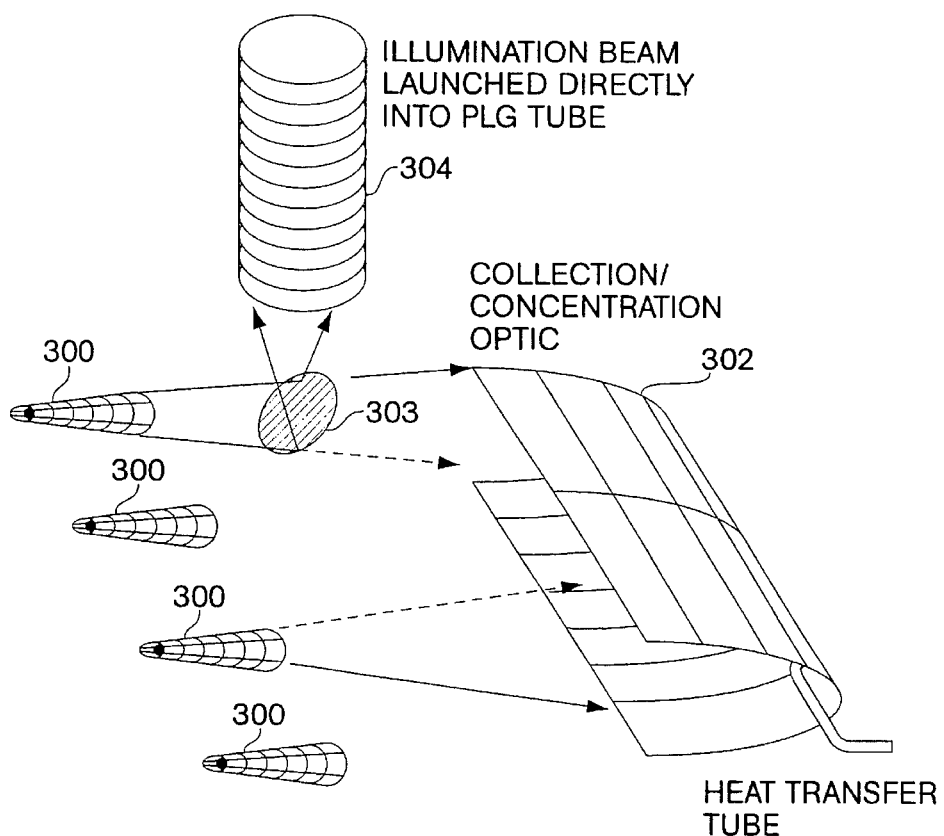
FIG. 20 is a perspective view of another embodiment of this invention showing collimated light sources can be aligned longitudinally along the length of a heat collection trough to take advantage of the heat collection trough geometry.

Referring to FIG. 20, in another embodiment of this invention, collimated light sources 300 can be aligned longitudinally along the length of a heat collection trough 302 to take advantage of the heat collection trough geometry. The illumination emitted from a source 300 is reflected by a selective minor 303 (visually reflective, infrared transmissive) and coupled into fibers via microcollector arrays of nonimaging optical collectors, or simply coupled directly into PLG tubes 304. The light will flow directly into the PLG tubes 304, as long as the source beam's divergence and diameter is within the PLG's acceptance angle and aperture. The source beam's divergence is determined by the depth of the source's non-imaging optical reflector. The source beam's diameter is a function of the light collection optic's distance from the source. Principles of partitioning may be studied for any particular application.

Figure 21:
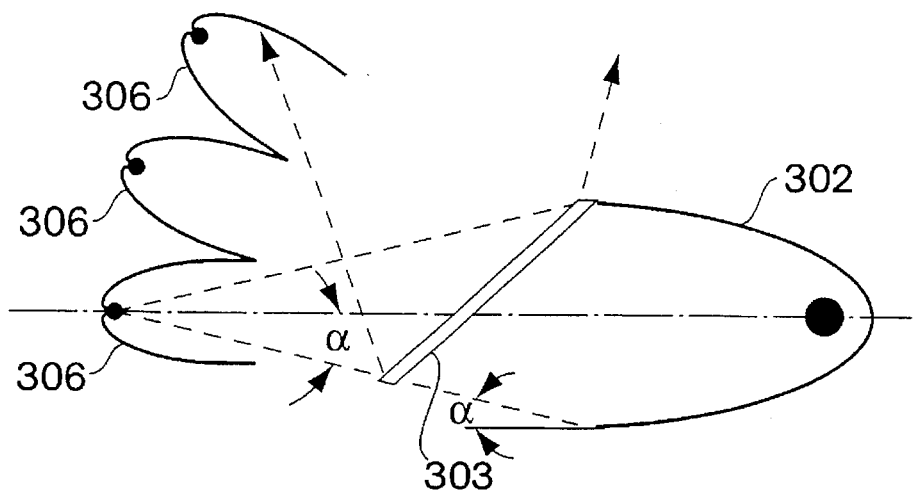
FIG. 21 is a diagrammatic section showing that sources can also be arrayed transverse to the heat collection trough.
Figure 22:
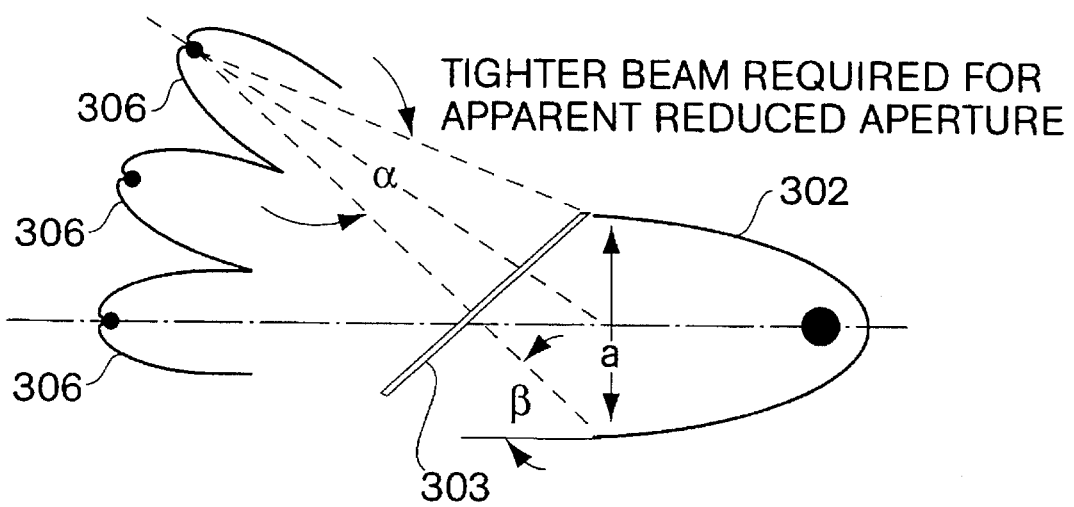
FIG. 22 is a diagrammatic section showing that sources transverse to the heat collector's optic axis will see a reduced apparent aperture.

Referring to FIG. 21, alternatively, sources 306 can also be arrayed transverse to the heat collection trough 302. However, this geometry is more challenging because the heat collector is optically constrained in the transverse direction. Transverse alignment of sources increases the divergence of the source beam from $\acute{a}$ to $\beta$ (FIG. 22). This reduces the heat collection optic's concentration ratio by requiring a broadening of its acceptance angle. Furthermore, the larger transverse area used by the sources 306 may cause interference with the light reflected from the selective mirror 303.

Referring to FIG. 22, sources transverse to the heat collector's optic axis will see a reduced apparent aperture, $a\cos\beta$, and will consequently need increased source reflector depth to maintain a slightly tighter beam. The cumulative divergence of sources would need to fall within the acceptance cone of the heat collection optic, so the addition of each transverse source increases the heat collector's acceptance angle by that source's divergence. Similarly, sources placed farther from the heat collector see a reduced aperture. Some transverse alignment may be acceptable if sources are clustered together, near the heat collector's optic axis. In this case, a marginal compromise in heat collection efficiency can permit much larger system capacity, within given spacial constraints.

As beam divergence of the source increases it becomes more difficult to facilitate light decoupling and collection. This difficulty is compounded in the transverse direction for multiple sources. Increasing source divergence affects light collector dimensions just as it affects heat collector dimensions. The collector warrants a collimated beam, the source warrants a divergent beam. Transverse alignment necessitates a compromise. Another possibility is the transverse alignment of sources and transverse alignment of collectors.

Light collector concentration can further be increased by reducing the acceptance angle of the light collector and by minimizing the source divergence. On one hand tightening the collimation of the source beam lowers source efficiency. On the other hand wide beam divergence reduces the concentration ratio of the light and heat collectors. Consequently, the heat beam focus will be of lower than a desirable temperature, the light beam will be focused on a larger than realizable diameter, and the result will be a much larger and more complicated coupler. For a given source size less light would be propagated down the individual fibers.

Figure 23:
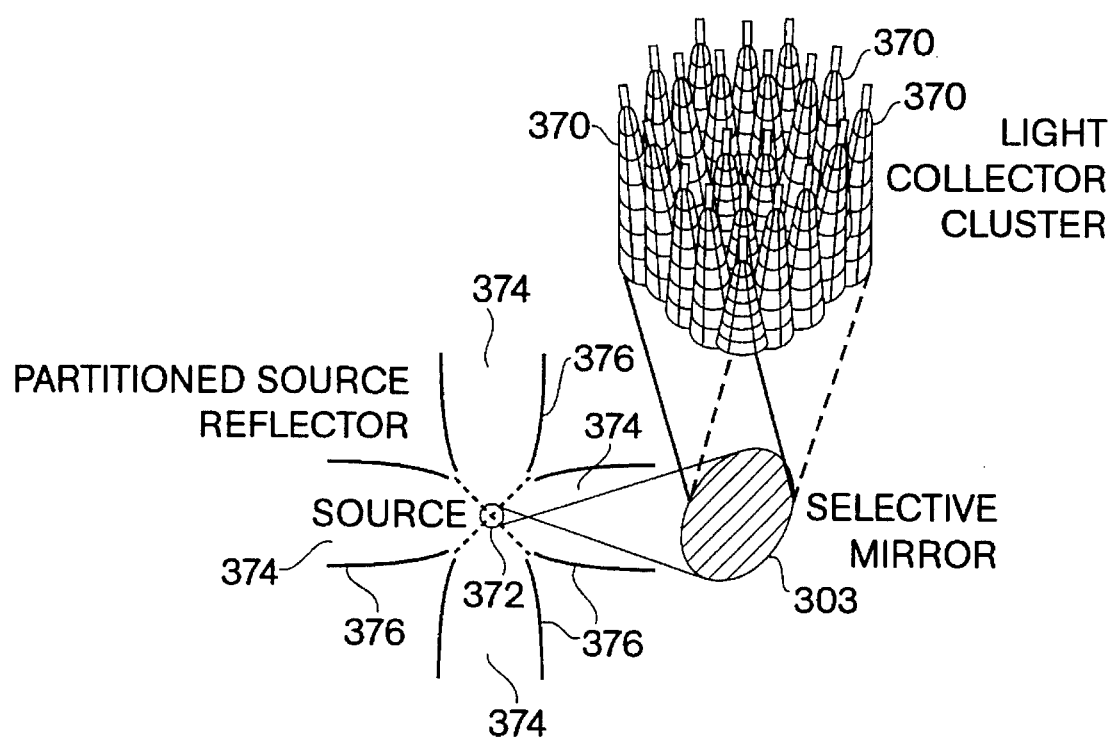
FIG. 23 is a diagrammatic view a partitioned source configuration of this invention.

Referring to FIG. 23, an alternative to excessive source restriction is clustering multiple light collectors 370 together, rather than further restricting source beam divergence. A light collector may be a single microcollector affixed to a single fiber. The farther that the coupler is from the source, the larger too will be the light collector's required aperture. Maximum performance, therefore, can be achieved with a light beam that is low in divergence and compact in diameter. However, such constrained source divergence will be difficult to attain without source reflector losses. A light collector cluster could accommodate a wider than desirable beamspread coming from the source. The greater the source's divergence and beam diameter, the greater the number of individual light collector units will be required to be clustered: forming a matrix 250 of light collectors similar in nature to the matrix of microcollectors 220 comprising the fiber optic coupler (FIG. 17). Each light collector subtends a portion of the beam field and may have its optic axis oriented toward the source or virtual source. In this manner the collectors partition the beam field.

The light collector may be conceptualized as an assemblage of smaller, fundamental units, with each fundamental unit managing a portion of its respective radiant energy beam. Beamspreads should be minimized to reduce the overall number of units in each component cluster. This, however, can compromise the optical efficiency of the source reflector. All components can be point focus optics, with the possible exception of the heat collection trough. This choice is made to simplify geometric considerations in the heat recovery system because the amount of recovered energy is likely to be fairly small. If a very large system is envisioned, then heat collection schemes may be devised that utilize more efficient point source heat collector/concentrators. Akin to a solar furnace, point focus heat collectors would square the recovered concentration ratios, leading to much higher temperatures and more efficient reutilization of recovered heat through increased thermodynamic quality. However, point focus heat collectors are likely to be more expensive than linear collection optics because they must withstand higher concentrations of heat for a given source magnitude and consequently are more difficult to manufacture due to the increased complexity of its shape.

Merging the light collectors in a similar manner to the microcollectors in the fiber optic coupler can avoid interconal void losses, which just like the core fraction of fibers constitutes an energy loss of at least 9% in the interstitial voids and the commensurate buildup of heat due to the losses in that area.

Source partitioning can also be an alternative to source clustering. Such partitioning can permit the use of single large light sources instead of intermingled smaller ones, provided the source has requisite brightness to drive the optical system to adequate luminance levels. In one embodiment, the source's radiant output is partitioned into six identical zones 374 (only four of which are shown in cross-section). Each source reflector 376 is a hexidirectional non-imaging optic subtending approximately $\frac{2}{3}\pi$ steradians. Each reflector portion can be a collector/concentrator with a concentration ratio of 20 used opposite to its intended capacity, thereby expanding and collimating its portion of the source's radiation to within the desired angular parameters.

An expansion ratio of 6 results in a 25° emittance from a 90° entrance beam. The ratio of aperture areas also equal 6, given by, $$C = \frac{(a)^2}{(a')} = \frac{\sin^2 90°}{\sin^2 25°} = 5.59 \approx 6$$

Consequently, if an entrance aperture of 2" is large enough to receive its full subtended portion of the source's radiation, the reflector has an exit aperture of about 4.75".

Figure 24:
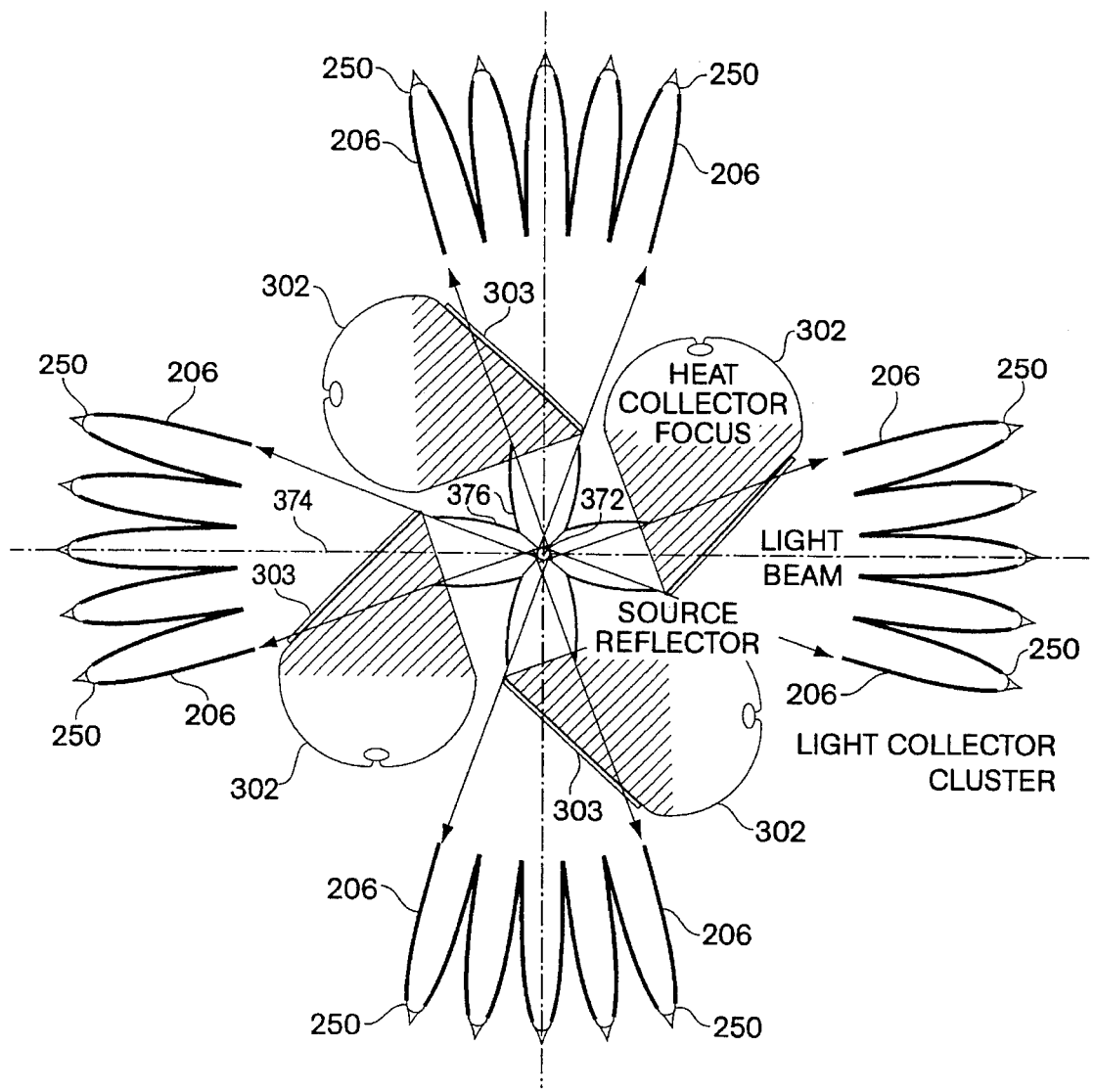
FIG. 24 is a diagrammatic section showing light collectors clustered and merged to receive partitioned source light.

Referring to FIG. 24, light collectors 206 can be clustered and merged to receive the partitioned source light. In this instance, each light collector couples to about 200 fibers and subtends 5°. A cluster of 20 light collectors subtends a solid angle of about 20° (shown as 5° in cross-section). At 20 light collectors per cluster this amounts to 4000 fibers per branch, or 24,000 fibers per central assembly. Each light collector may be a single microcollector affixed to the end of a single fiber.

Working backwards from the end-use requirements one can establish the approximate magnitude of the required source. An output from the end of a fiber of 2500 lumens would provide roughly the luminous output of a fluorescent lamp housed inside of a highly efficient reflector, or a 200 watt incandescent halogen source. 24,000 fibers carrying 2500 lumens each indicates a source magnitude of 60,000,000 lumens. This corresponds to 0.6 MW source for an HID source at 100 lumens/watt, assuming that a source with the requisite brightness is developed. Conventional point source fixtures can be placed every 25 $ft^2$, or so. With the same spacing, and one fiber running to each fixture, the 24,000 fixtures illuminate an area of 600,000 $ft^2$, or 20 floors at 30,000 $ft^2$/floor.

2500 lumens directed at every 25 $ft^2$ of floor space illuminates to 100 FC at CU=1 for direct illumination or 50 FC at CU=0.5 for indirect illumination. 600,000 watts/600,000 $ft^2$ corresponds to 1.0 watt/$ft^2$ prior to factors for heat pre-emption, heat recovery and mechanical system reutilization of electric light heat, sunlight integration, solar heat recovery and mechanical system reutilization of solar heat.

Desired light flow levels in the fibers can be achieved by varying the source's magnitude and the source reflector's expansion ratio. Dimming is centralized, not localized. Localized dimming connotes some type of energy loss, either through reflective or absorptive shuttering. Uniformity of amount of light coupled into each fiber is in the domain of the fiber coupler, and remains an area of concern.

By using a source with highly radiative output its energy can be managed optically. Light and heat are optically directed at points or lines (refocused but not reimaged). Generally, the heat collectors are troughs (line focus) whereas light collectors are non-imaging optics with overlapping envelopes. As the source moves closer to the collection optic, the angle subtended by the collection optic increases. Conversely, the closer that the source is to the heat collector the greater the acceptance angle that the heat collector must be designed for, and the lower that the attainable heat concentration ratio becomes. Furthermore, the greater the diameter and divergence of the partitioned source beam, the more optical hardware that will be required for recompressing and further partitioning the light.

Without partitioning, there will be certain practicable limits in the amount of source collimation that is achievable. Optic axes of the light collectors will be oriented toward the source, or virtual source. The light collectors will be arrayed to accept the divergence of the source beam only, their optic axes converging at some point near or at the source. Clearly, the closer the light collectors are to the source the less overall aperture they will consume.

In this instance, the light collector cluster subtends a relatively small solid angle, dictated by the partitioned source beam's divergence and geometry of mirror placement. This method of partitioning having a multiple non-imaging optic source reflector is applicable to any foreseeable light piping application.

The capacity of the system to provide illumination to large spaces can be increased by enlarging source magnitude, without decreasing source brightness. In a smaller system with an unpartitioned source reflector, energy density at the fiber optic coupler can be increased by placing additional lamps along the meridional axis, transverse axis, or both as long as beamspreads remain inside of the collection optic's acceptance angles, and the optical system's extent is not surpassed.

Figure 25:
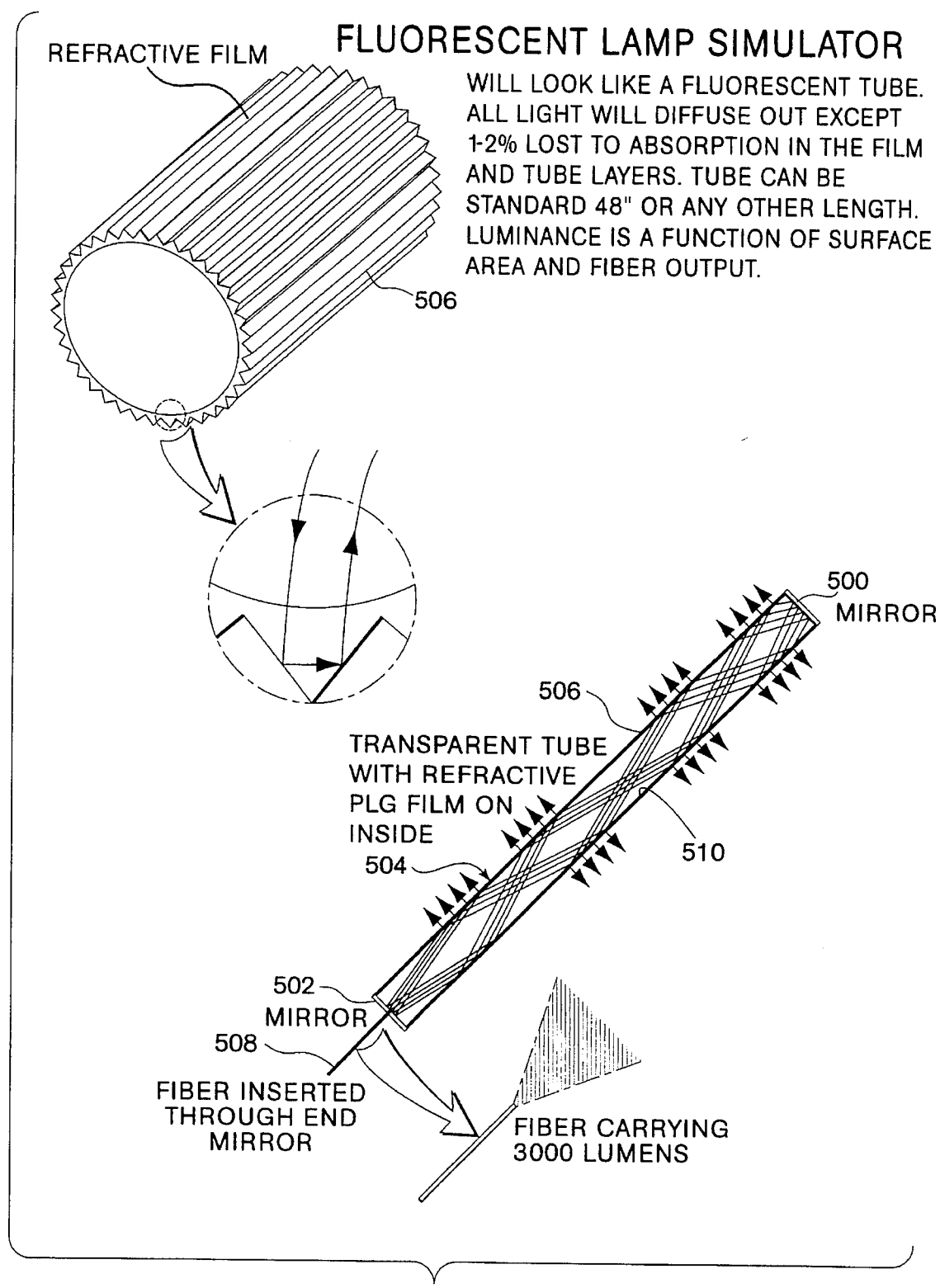
FIG. 25 illustrates a light fixture of this invention for simulating a fluorescent lamp.

FIG. 25 is a simple, low-loss optical system for diffusing fiber piped light in such a way as to simulate a fluorescent tube. A mirror 500, 502 is placed at each end of a transparent tube 504 that has a refractive light piping film 506 applied to its interior. A light carrying fiber 508 is punched through the center of one of the mirrors 502, which becomes the entrance end of the device. The light then bounces 510 along the length of the tube diffusing about 2% of its energy with each bounce, according to the diffusion properties of the film, provided that the light emitted from the fiber is within the acceptance angle of the film. When the light hits the mirror 500 at the opposite end of the tube, it is sent back along the length diffusing more light with each bounce. A negligible percentage of light gets reflected back into the fiber.

3000 lumens emitted from the end of a small fiber is much brighter than its rough equivalent of a 34 watt 48" fluorescent tube emitting the same amount of light. A simple way to reduce the luminance of the fiber end is to collect the light into this type of device. Luminance would vary according to surface area so shorter lengths would have higher surface luminances and lengths greater than 18" would have decreased luminance for a given fiber output. At 18" length, to fit into existing fixtures as a retrofit, the tube would be 1" in diameter to simulate brightness of a standard 1" diameter tube, and 1½" in diameter to simulate brightness of standard 1½" tube. This would grant a great deal of flexibility to interior lighting designers who might want to experiment with lamp lengths differing from conventional practice. Even within the vein of conventional ceiling grids, luminance can be suitably tailored on-site without having to resort to changing lamps, ballasts and fixture hardware.

A high attenuation fiber could also be used in lieu of this device, but luminance along its length would likely be less uniform. Also, its absorption losses would be higher, and its brightness might be too high for visual comfort so it would have to be placed inside a diffusing volume which would lower further its efficiency when compared to this method.

Half of the sun's energy that reaches the earth is light and half of it is radiative heat. The sun can provide 10,000 FC of light and 500 w/$m^2$ of heat simultaneously at peak conditions, or 1 kw/$m^2$ of heat if all of the energy is absorbed. Generally, solar heat causes air conditioning loads in buildings with large fenestrations to increase during periods of solar availability, working against the huge potential merit of perimeter sunlighting for reducing energy consumption in buildings.

Figure 26:
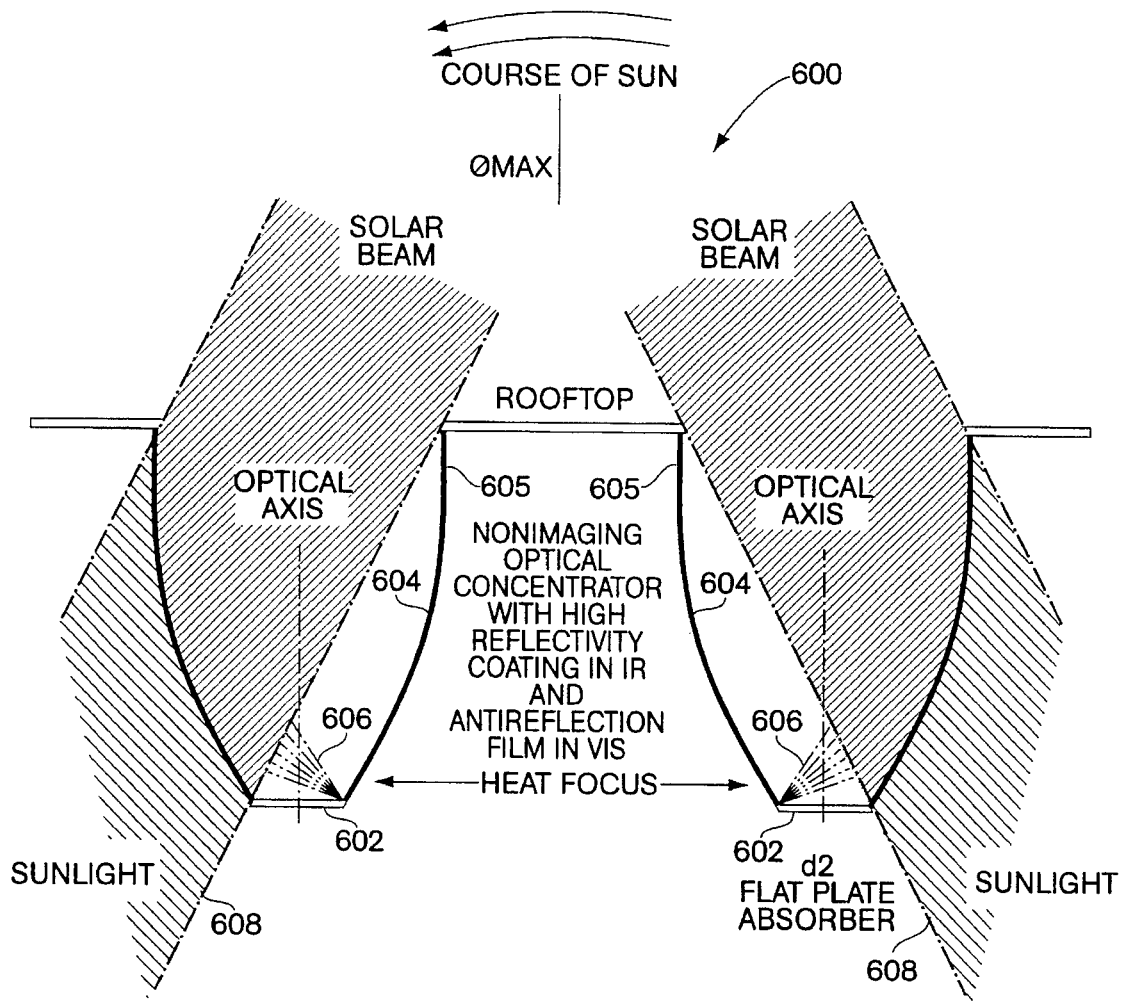
FIG. 26 is a transparent solar collector/concentrator of this invention for use as a window or skylight.

FIG. 26 is a 'transparent solar collector/concentrator 600 for use as a window of skylight. Collector/concentrator 600 keeps solar heat outside of the building envelope while permitting the passage of light. Rather than simply rejecting the heat that is incumbent upon the building's envelope, however, the solar heat is collected, concentrated, and directed at a heat focus 602 which can include a transfer tube or photovoltaic cell within the device but outside of the building's envelope. A frequency selective filter 604 to reflect IR and UV components of solar energy is applied to a non-imaging optical light collector/concentrator 605 with a transparent substrate instead of an opaque substrate. The result is a partially transparent solar collector that collects and concentrates IR and UV 606 but which allows sunlight 608 to pass right through the device and into the building.

The invention may be embodied in other specific forms without departing from the spirit and the essential characteristics thereof. Accordingly, the invention is to be defined not by the proceeding description, which is intended as illustrative, but by the claims that follow.

What is claimed is:

1. A light coupler, comprising an array of non-imaging optical microcollectors, each of the non-imaging optical microcollectors having an entrance aperture for receiving light emitted from a source, an optical axis, and an exit aperture for emitting the light received by the entrance aperture, the entrance apertures of the non-imaging optical microcollectors being mapped to a portion of a spherical surface having a radial center at an apparent center of the source, wherein the non-imaging optical microcollectors are adapted and arranged such that the entrance apertures of the non-imaging optical microcollectors together subtend an acceptance angle for accepting divergent light emitted from the source and such that the optical axes of the non-imaging optical microcollectors converge, the acceptance angle being substantially matched to a divergence angle of the source.

2. The light coupler of claim 1, further comprising a light conductor coupled to the exit aperture of one of the non-imaging optical microcollectors for conducting the light emitting from the exit aperture of that non-imaging optical microcollector to a remote location.

3. The light coupler of claim 2, wherein the light conductor comprises a single optical fiber.

4. The light coupler of claim 2, wherein the light conductor comprises a plurality of optical fibers.

5. The light coupler of claim 2, wherein the light conductor comprises a Prism Light Guide (PLG) tube.

6. The light coupler of claim 1, wherein at least one of the non-imaging optical microcollectors comprises a refractive medium.

7. A light coupler, comprising an array of non-imaging optical microcollectors, each of the non-imaging optical microcollectors having an entrance aperture for receiving light emitted from a source, an optical axis, and an exit aperture for emitting the light received by the entrance aperture, the entrance apertures of the non-imaging optical microcollectors being mapped to a portion of a parabolic surface having a focus at an apparent center of the source, wherein the non-imaging optical microcollectors are adapted and arranged such that the entrance apertures of the non-imaging optical microcollectors together subtend an acceptance angle for accepting divergent light emitted from the source and such that the optical axes of the non-imaging optical microcollectors converge, the acceptance angle being substantially matched to a divergence angle of the source.

8. The light coupler of claim 7, further comprising a light conductor coupled to the exit aperture of one of the non-imaging optical microcollectors for conducting the light emitting from the exit aperture of that non-imaging optical microcollector to a remote location.

9. The light coupler of claim 8, wherein the light conductor comprises a single optical fiber.

10. The light coupler of claim 8, wherein the light conductor comprises a plurality of optical fibers.

11. The light coupler of claim 8, wherein the light conductor comprises a Prism Light Guide (PLG) tube.

12. The light coupler of claim 4, wherein at least one of the non-imaging optical microcollectors comprises a refractive medium.

13. A light coupler, comprising an array of non-imaging optical microcollectors, each of the non-imaging optical microcollectors having an entrance aperture for receiving light emitted from a source, an optical axis, and an exit aperture for emitting the light received by the entrance aperture, wherein the non-imaging optical microcollectors are adapted and arranged such that the entrance apertures of the non-imaging optical microcollectors together subtend an acceptance angle for accepting divergent light emitted from the source and such that the optical axes of the non-imaging optical microcollectors converge, the acceptance angle being between 10° and 40°.

14. A light coupler, comprising an array of non-imaging optical microcollectors, each of the non-imaging optical microcollectors having an entrance aperture for receiving light emitted from a source, an optical axis, and an exit aperture for emitting the light received by the entrance aperture, wherein the non-imaging optical microcollectors are adapted and arranged such that the entrance apertures of the non-imaging optical microcollectors together subtend an acceptance angle for accepting divergent light emitted from the source and such that the optical axes of the non-imaging optical microcollectors converge, the source comprising an inverted non-imaging optic concentrator for substantially collimating light from an artificial light source.

15. The light coupler of claim 11, wherein the source comprises a plurality of the inverted non-imaging optic concentrators for partitioning and substantially collimating the light from the artificial source.

16. A light coupler, comprising an array of non-imaging optical microcollectors, each of the non-imaging optical microcollectors having an entrance aperture for receiving light emitted from a source, an optical axis, and an exit aperture for emitting the light received by the entrance aperture, wherein the non-imaging optical microcollectors are adapted and arranged such that the entrance apertures of the non-imaging optical microcollectors together subtend an acceptance angle for accepting divergent light emitted from the source and such that the optical axes of the non-imaging optical microcollectors converge, the source comprising an output aperture of a light conductor.

17. A light coupler, comprising an array of non-imaging optical microcollectors, each of the non-imaging optical microcollectors having an entrance aperture for receiving light emitted from a source, an optical axis, and an exit aperture for emitting the light received by the entrance aperture, the entrance apertures of the non-imaging optical microcollectors being mapped to a portion of a spherical surface having a radial center at a center of the source, wherein the non-imaging optical microcollectors are adapted and arranged such that the entrance apertures of the non-imaging optical microcollectors together subtend an acceptance angle for accepting divergent light emitted from the source and such that the optical axes of the non-imaging optical microcollectors converge, the acceptance angle being substantially matched to a divergence angle of the source.

18. The light coupler of claim 17, further comprising a light conductor coupled to the exit aperture of one of the non-imaging optical microcollectors for conducting the light emitting from the exit aperture of that non-imaging optical microcollector to a remote location.

19. The light coupler of claim 18, wherein the light conductor comprises a single optical fiber.

20. The light coupler of claim 18, wherein the light conductor comprises a plurality of optical fibers.

21. The light coupler of claim 18, wherein the light conductor comprises a Prism Light Guide (PLG) tube.

22. The light coupler of claim 17, wherein at least one of the non-imaging optical microcollectors comprises a refractive medium.

23. A light coupler, comprising an array of non-imaging optical microcollectors, each of the non-imaging optical microcollectors having an entrance aperture for receiving light emitted from a source, an optical axis, and an exit aperture for emitting the light received by the entrance aperture, the entrance apertures of the non-imaging optical microcollectors being mapped to a portion of a parabolic surface having a focus at a center of the source, wherein the non-imaging optical microcollectors are adapted and arranged such that the entrance apertures of the non-imaging optical microcollectors together subtend an acceptance angle for accepting divergent light emitted from the source and such that the optical axes of the non-imaging optical microcollectors converge, the acceptance angle being substantially matched to a divergence angle of the source.

24. The light coupler of claim 23, further comprising a light conductor coupled to the exit aperture of one of the non-imaging optical microcollectors for conducting the light emitting from the exit aperture of that non-imaging optical microcollector to a remote location.

25. The light coupler of claim 24, wherein the light conductor comprises a single optical fiber.

26. The light coupler of claim 24, wherein the light conductor comprises a plurality of optical fibers.

27. The light coupler of claim 24, wherein the light conductor comprises a Prism Light Guide (PLG) tube.

28. The light coupler of claim 23, wherein at least one of the non-imaging optical microcollectors comprises a refractive medium.

* * * * *